(12) United States Patent
Tang et al.

(10) Patent No.: US 9,307,222 B1
(45) Date of Patent: Apr. 5, 2016

(54) CONFIGURATION SETTINGS OF A DIGITAL CAMERA FOR DEPTH MAP GENERATION

(71) Applicant: Adobe Systems Incorporated, San Jose, CA (US)

(72) Inventors: Huixuan Tang, Toronto (CA); Scott Cohen, Sunnyvale, CA (US); Stephen Schiller, Oakland, CA (US); Brian Price, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/577,792

(22) Filed: Dec. 19, 2014

(51) Int. Cl.
*H04N 5/232* (2006.01)
*H04N 13/00* (2006.01)

(52) U.S. Cl.
CPC ....... *H04N 13/0022* (2013.01); *H04N 5/23222* (2013.01); *H04N 2213/003* (2013.01)

(58) Field of Classification Search
CPC .......... H04N 13/0022; H04N 5/23222; H04N 2213/003; H04N 1/387; H04N 1/3878; H04N 1/4092; H04N 5/23232; H04N 5/33; H04N 9/045; H04N 13/0029; H04N 19/132; H04N 19/46; H04N 19/63; H04N 19/98; H04N 1/39
USPC .................................................. 348/135, 46
See application file for complete search history.

(56) References Cited

U.S. PATENT DOCUMENTS

| 8,447,141 | B2* | 5/2013 | Barenbrug | G06T 7/0053 358/3.26 |
|---|---|---|---|---|
| 2008/0075383 | A1 | 3/2008 | Wu | |
| 2009/0268985 | A1 | 10/2009 | Wong | |
| 2012/0113100 | A1* | 5/2012 | Niioka | G02B 27/2214 345/419 |
| 2012/0219236 | A1* | 8/2012 | Ali | G06T 5/002 382/276 |
| 2012/0229602 | A1* | 9/2012 | Chen | H04N 19/597 348/43 |
| 2013/0084019 | A1* | 4/2013 | Crandall | G06T 5/003 382/255 |
| 2013/0129233 | A1 | 5/2013 | Schiller | |
| 2013/0141537 | A1 | 6/2013 | Li | |
| 2013/0258096 | A1 | 10/2013 | Ali | |
| 2013/0259315 | A1* | 10/2013 | Angot | H04N 13/026 382/106 |
| 2014/0009574 | A1* | 1/2014 | Hannuksela | H04N 19/00769 348/42 |

(Continued)

OTHER PUBLICATIONS

N. Asada, A. Amano, and M. Baba, Photometric Calibration of Zoom Lens Systems, Pattern Recognition, Proceedings of the 13th International Conference, Aug. 1996, vol. 1, pp. 186-190.

(Continued)

*Primary Examiner* — Hung Lam
(74) *Attorney, Agent, or Firm* — Kilpatrick Townsend & Stockton LLP

(57) ABSTRACT

Systems and methods are disclosed for identifying image capture instructions for capturing images that may be used to generate quality depth maps. In some examples, the image capture instructions are generated by predictively determining in a scene-independent manner configuration settings to be used by a camera to capture a minimal quantity of images for generating the quality depth map. The image capture instructions may thus indicate a quantity of images to be captured and the aperture and focus settings to be used when capturing the images. The image capture instructions may be determined based in part on a distance estimate, camera calibration information and a predetermined range of optimal blur radii. The range of optimal blur radii ensures that there will be sufficient depth information for generating a depth map of a particular quality from the yet-to-be-captured images.

20 Claims, 7 Drawing Sheets

(56) References Cited

U.S. PATENT DOCUMENTS

| | | | |
|---|---|---|---|
| 2014/0341292 A1 | 11/2014 | Schwarz | |
| 2015/0002724 A1* | 1/2015 | Chuang | H04N 5/23293 |
| | | | 348/346 |
| 2015/0147047 A1 | 5/2015 | Wang | |

OTHER PUBLICATIONS

S. Bae and F. Durand, Defocus Magnification, Computer Graphic Forum, 2007, vol. 26, No. 3, 9 Pages.

J. T. Barron and J. Malik, Intrinsic Scene Properties From a Single RGB-D Image, Computer Vision Pattern Recognition (CVPR), 2013, 8 pages.

Y. Boykov, O. Veksler, and R. Zabih, Fast Approximate Energy Minimization via Graph Cuts, IEEE Transactions Pattern Analysis Machine Intelligence, Nov. 2001, vol. 23, No. 11:Nov. 2001, pp. 1-18.

J. Chen, L. Yuan, C. Keung Tang, and L. Quan, Robust Dual Motion Deblurring, IEEE Conference on Computer Vision and Pattern Recognition (CVPR), 2008, 8 pages.

P. Favaro, Recovering Thin Structures via Nonlocal-Means Regularization with Application to Depth from Defocus, Computer Vision and Pattern Recognition (CVPR), 2010 IEEE Conference, 8 pages.

P. Favaro, S. Soatto, M. Burger, S. J. Osher, Shape from Defocus via Diffusion, IEEE Transactions on Pattern Analysis and Machine Intelligence, Mar. 2008, pp. 1-14.

S. Hasino, K. Kutulakos, A Layer-Based Restoration Framework for Variable-Aperture Photography, Computer Vision, IEEE 11th International Conference, 2007, 8 Pages.

S. W. Hasino, K. N. Kutulakos, Confocal Stereo, International Journal of Computer Vision, 2009, vol. 81, Issue 1, 23 Pages.

P. Henry, M. Krainin, E. Herbst, X. Ren, and D. Fox, RGB-D Mapping: Using Kinect-Style Depth Cameras for Dense 3D Modeling of Indoor Environments, International Journal of Robotics Research (IJRR), Apr. 2012, vol. 31, Issue, 17 Pages.

A. Ito, S. Tambe, K. Mitra, A. Sankaranarayanan, and A. Veeraraghavan., Compressive Epsilon Photography for Post-Capture Control in Digital Imaging. ACM TransacationsGraphics, Jul. 12, 2014, vol. 33, Issue 4, Article No. 88, 12 pages.

S. Izadi, D. Kim, O. Hilliges, D. Molyneaux, R. Newcombe, P. Kohli, J. Shotton, S. Hodges, D. Freeman, A. Davison, and A. Fitzgibbon, Kinectfusion: Realtime 3D Reconstruction and Interaction Using a Moving Depth Camera, ACM Symposium on User Interface Software and Technology, 2011, 10 Pages.

N. Joshi, R. Szeliski, and D. J. Kriegman, PSF Estimation Using Sharp Edge Prediction, IEEE Conference on Computer Vision and Pattern Recognition, 2013, 8 Pages.

C. Kolb, D. Mitchell, and P. Hanrahan, A Rrealistic Camera Model for Computer Graphics, 22nd Annual Conference on Computer Graphics and Interactive Techniques, 1995, 8 Pages.

P. Krahenbuhl and V. Koltun, Efficient Inference in Fully Connected CRFs with Gaussian Edge Potentials.117. Curran Associates, Inc., 2011, 9 pages.

M. Levoy, P. Hanrahan, Light Field Rendering, 23rd Annual Conference on Computer Graphics and Interactive Techniques, SIGGRAPH 1996, 12 Pages.

C. Liu, Beyond Pixels: Exploring New Representations and Applications for Motion Analysis, Submited to Department of electrical Engineering and Computer Science MIT, May 2009, 164 Pages.

S. Nayar and Y. Nakagawa, Shape from Focus, IEEE Transactions on Pattern Analysis and Machine Intelligence, vol. 16, No. 8:, Aug. 1994, pp. 824-831.

W. H. Press, S. A. Teukolsky, W. T. Vetterling, and B. P. Flannery, Numerical Recipes 3rd Edition: The Art of Scientifc Computing, Cambridge University Press, New York, NY, USA, 3 edition, 2007, pp. 76-79, 94, 364, 483, 534, and 981.

X. Ren, L. Bo, and D. Fox, RGB-(D) Scene Labeling: Features and Algorithms, Computer Vision Pattern Recognition (CVPR), 2012, 8 Pages.

S. Song and J. Xiao, Tracking Revisited Using RGBD Camera: Unified Benchmark and Baselines, IEEE International Conference on Computer Vision, ICCV 2013, Sydney, Australia, Dec. 2013, 8 Pages.

R. Tsai, An Efficient and Accurate Camera Calibration Technique for 3D Machine Vision, Computer Vision and Pattern Recognition (CVPR), 1986 IEEE Conference, 12 Pages.

X. Zhu, S. Cohen, S. Schiller, and P. Milanfar, Estimating Spatially Varying Defocus Blur from a Single Image, IEEE Transactions on Image Processing, 2013, pp. 1-13 Pages.

S. Zhuo and T. Sim, Defocus Map Estimation from a Single Image, Elsevier, Pattern Recognition, Sep. 2011, vol. 44, pp. 1852-1858.

Carlos Hernandez, Research Blog: Lens Blur in the New Google Camper App, http://googleresearch.blogspot.com/2014/04/lens-blur-in-new-google-camera-app.html, Posted Apr. 16, 2014, accesed Jan. 21, 2015, 11 Pages.

Notice of Allowance from related U.S. Application 14/552,332 dated Nov. 10, 2015, 19 pages.

Notice of Allowance from related U.S. Application 14/576,936 dated Nov. 24, 2015, 20 pages.

* cited by examiner

CONFIGURATION SETTINGS OF A DIGITAL CAMERA FOR DEPTH MAP GENERATION

CROSS-REFERENCE TO RELATED APPLICATIONS

This application is related to co-pending U.S. application Ser. No. 14/552,332 filed on Nov. 24, 2014, and U.S. application Ser. No. 14/576,936 filed on Dec. 19, 2014, the contents of each is hereby incorporated in their entirety by reference.

TECHNICAL FIELD

This disclosure relates generally to methods and systems for predictively determining configuration settings for a digital camera and a quantity of images to be captured by the digital camera using those setting for the purpose of estimating depth of a scene represented by the quantity of images.

COPYRIGHT NOTIFICATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Digital cameras, including digital single-lens reflex (DSLR) cameras and digital cameras integrated into mobile devices, often have sophisticated hardware and software that enables a user to capture digital images using a combination of different user-defined and camera-defined configuration settings. A digital image provides a digital representation of a particular scene. A digital image may subsequently be processed, by itself or in combination with other images, to derive additional information from the image. For example, one or more images may be processed to estimate the depths of the objects depicted within the scene, i.e., the distance of each object from a location from which the picture was taken. The depth estimates for each object in a scene, or possibly each pixel within an image, are included in a file referred to as a "depth map." Among other things, depth maps may be used to improve existing image editing techniques (e.g., cutting, hole filling, copy to layers of an image, etc.)

Depth from defocus is a conventional technique used to estimate depth of a scene using out-of-focus blur (i.e., to generate depth maps). Depth estimation using such techniques is possible because imaged scene locations will have different amounts of out-of-focus blur (i.e., depth information) based on the configuration settings of the camera (e.g., aperture setting and focus setting) used to take the images. Estimating depth, therefore, involves estimating the amount of depth information at the different scene locations, whether the depth information is derived from one image or from multiple images. Conventionally, the accuracy of such estimates depends on the number of images used, and the amount of depth information. This is because the greater the number of images that are inputted, the greater the amount of depth information that can be compared for any one position (e.g., pixel) in the scene.

A conventional depth from defocus technique compares blurry patches in a single image with certain assumptions about the scene derived from prior image models. While these assumptions may hold true for certain scenes, they fail when the underlying image does not have sufficient depth information to fit the assumptions. Another conventional technique estimates depth by processing multiple images captured as a focal stack (i.e., same aperture, different focus) and fitting those images to an image model. The number of images typically corresponds to the number of available focus settings for the digital camera. This can lead to inefficiencies because often more images are taken than may otherwise be required to provide sufficient depth information. In addition, this technique requires that the images be fitted to an image model, which can lead to imprecise depth estimates. Yet another conventional technique estimates depth by processing multiple images captured as an aperture stack (i.e., same focus, different aperture). Similar to the focal stack technique, this conventional technique requires that many images be taken, which can be inefficient when fewer images would provide sufficient depth information. And even though this aperture stack technique often captures more images than may otherwise be required, because the camera configuration settings are not predetermined to preserve optimal depth information, the resulting images often have areas where the depth information is insufficient. Thus, the depth maps outputted from processing images captured using this aperture stack technique are often very coarse. Finally, a last conventional technique processes a dense set of images (i.e., hundreds of images) with varying aperture and focus settings and compares each pixel in the dense set of images to estimate depth. This conventional technique outputs a precise depth map, but still requires the dense set of images that can be inefficient to capture and process.

Thus, conventional depth from defocus techniques rely on assumptions about the scene, require the user to capture a large number of input images, require the user to capture images using patterns of camera settings that are not predetermined to preserve sufficient depth information, and/or are capable of outputting only a low quality depth map. Accordingly, it is desirable to provide improved solutions for predictively determining a minimum number of images to be captured and the camera configuration settings used for capturing them, such that the images collectively provide sufficient depth information from which a quality depth map can be generated.

SUMMARY

Systems and methods are provided for predictively determining image capture instructions for use in capturing images that can be processed to generate a quality depth map. In particular, the image capture instructions, once determined, indicate a minimum number of images to be taken, and with which aperture and focus settings they should be taken such that the images will provide sufficient depth information from which can be generated a depth map having a certain degree of depth quality. In some examples, depth quality is represented by unambiguous depth estimates (e.g., depth estimates that avoid multiple peaks when evaluated using a depth likelihood function). The image capture instructions are determined by evaluating a scene-independent portion of a depth discrimination function using calibration data for the digital camera that is used to capture the images. In some examples, a sufficient amount of depth information means that, for each depth of interest within a depth range, the corresponding blur radius within at least two images of the minimum number of images is about 1 to about 2 pixels.

The image capture instructions are determined based on (1) an input identifying an estimate of the closest distance from the camera of an object in a scene to be imaged and (2) calibration data for the camera. The calibration data defines, for a given aperture setting, the rates at which blur in an image increases as positions in the image move away from a focal plane (i.e., a plane in the scene that is entirely in focus). For example, for a larger aperture, the calibration data defines that the blur increases at a greater rate as a position in the image is moved away from the focal plane as compared to smaller apertures. In some examples, to determine the image capture instructions, an image characteristic engine evaluates one or more aperture settings with different combinations of focus settings over a set of depth values within a depth range, to determine how many images can be captured using those configuration settings such that a range of optimal blur radii in each image is about 1 to about 2 pixels. The minimum depth of the depth range is set as the distance estimate that was inputted for the scene. The maximum depth of the depth range may be any depth greater than the minimum depth, but for convenience may be assumed to be infinity. Thus, if the inputted distance estimate for the scene is two meters, the depth range may be set as two meters to infinity.

To ensure that there is sufficient depth information throughout the depth range, the image characteristic engine accesses the calibration data for the camera and uses the data to determine configuration settings for images to be captured within the depth range. In one example, which can be used for any camera lens, the image characteristic engine holds the aperture setting constant and selects a depth value (set to the minimum depth of the depth range in the first iteration) to determine a focus setting, greater than the depth value, with which an image can be captured having sufficient depth information (e.g., the range of optimal blur radii is about 1 to about 2 pixels at the depth value). A next depth value, greater than the prior focus setting, is then determined at which the captured image will still have sufficient depth information (e.g., the range of optimal blur radii will still be about 1 to about 2 pixels) and a next focus setting, greater than the next depth value, is determined at which the captured image will continue to have sufficient depth information. This process is repeated over the entire depth range, each time outputting a focus setting. The resulting set of focus settings corresponds to the number of images that should be captured of the scene to ensure that sufficient depth information is available for generating a quality depth map. In another example, which can also be used for any camera lens, the image characteristic engine determines the set of optimal focus settings using a simplified mathematical function that approximates blur radius based on the thick lens constant. With either example, the image capture instructions are determined using the aperture setting and the determined set of focus settings.

The evaluation performed by the image characteristic engine ensures that the quantity of images and corresponding focus settings are determined in a manner such that the depths of field corresponding to the images do not substantially overlap, do not have substantial gaps, and are laid out equally within the depth range. A depth of field is an interval within the depth range (e.g., two meters to infinity) having a focal plane (e.g., a focus setting) at the center of the interval. In particular, the depth of field intervals are laid out in a manner that ensures a range of optimal blur radii of about 1 to about 2 pixels for any pixel within the depth range (e.g., at two meters, at five meters, at a hundred meters, etc.), including the pixels within the depth of field intervals and at the edges of the depth of field intervals. Thus, a depth range will have more than one depth of field interval depending on the number of images identified by the image capture instructions. In some examples, the depth range optimally has at least two depth of field intervals. The range of optimal blur radii includes the extent of blur that any pixel should experience within the entire depth range. Pixels in the range of optimal blur radii may have blur radii of about 1 to about 2 pixels. This measure of the blur radii may be used as a constraint when evaluating a set of depth values over the depth range.

These illustrative examples are mentioned not to limit or define the disclosure, but to provide examples to aid understanding thereof. Additional examples are discussed in the Detailed Description, and further description is provided there.

BRIEF DESCRIPTION OF THE FIGURES

These and other features, examples, and advantages of the present disclosure are better understood when the following Detailed Description is read with reference to the accompanying drawings, where.

DETAILED DESCRIPTION

Figure 1:
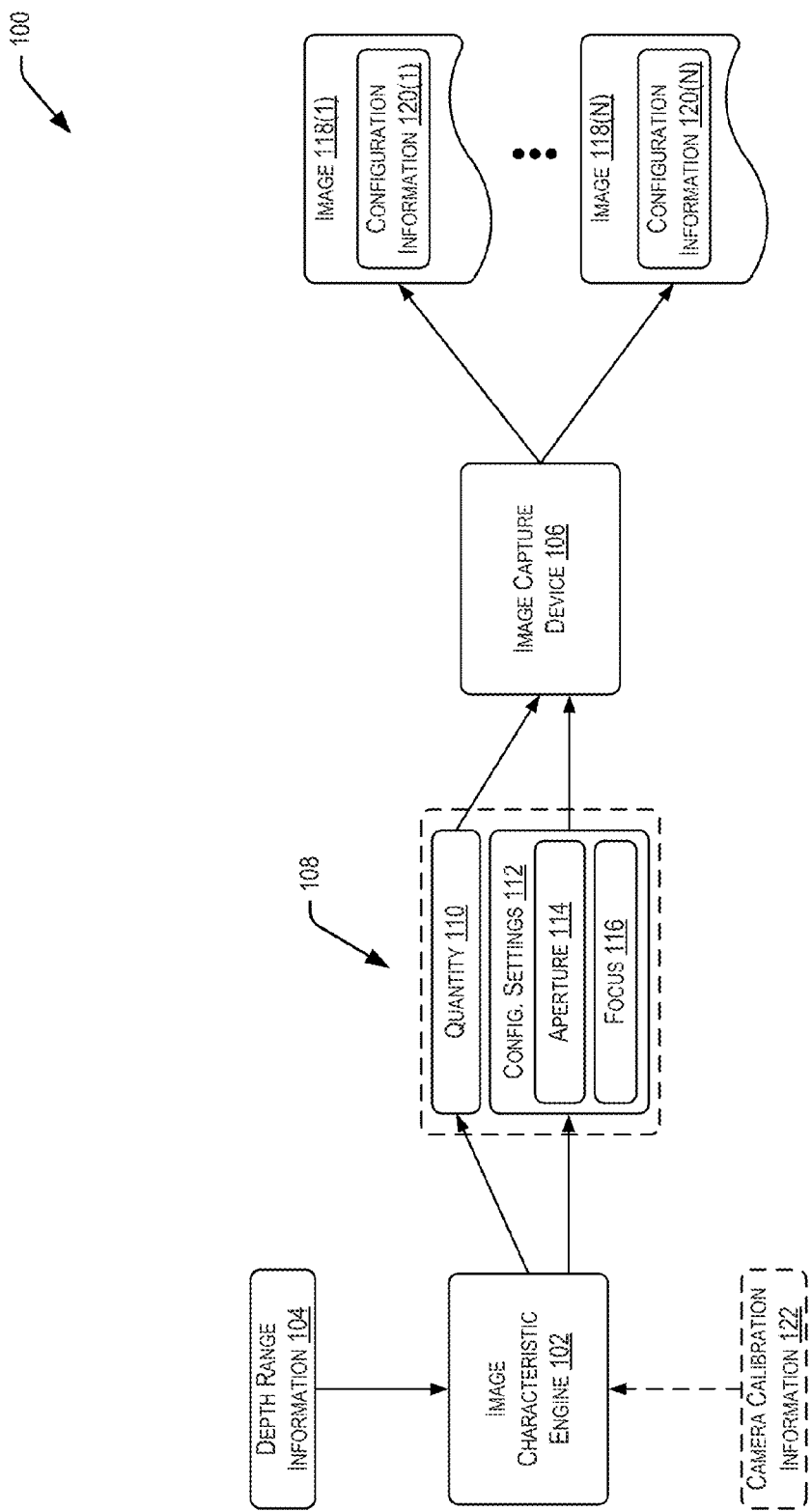
FIG. 1 is a block diagram depicting an example image characteristic engine, an example image capture device, and example inputs and outputs of each for implementing techniques relating to determining image capture instructions for use in depth map generation according to at least one embodiment.

Computer-implemented systems and methods are disclosed for determining image capture instructions for use in depth map generation. As introduced above, a depth map may be generated by, for example, comparing differences in defocus blur associated with two or more input images.

Techniques described herein overcome the deficiencies identified above by predictively determining image capture instructions in a manner that is scene independent, preserves sufficient depth information, minimizes the number of images to be taken, and ensures that a quality depth map can be generated from the images. In some examples, depth quality is represented by unambiguous depth estimates (e.g., depth estimates that avoid multiple peaks when evaluated using a depth likelihood function). The image capture instructions include the number of images to be taken and the aperture settings and the focus settings for each image.

The image capture instructions are determined without relying on data gathered from the scene to be captured, an all-in-focus image, or an image model. Instead, the image capture instructions are determined using results of an evaluation of a depth discriminability function to maximize a scene independent portion thereof. The scene independent portion of the depth discriminability function is specific to a particular digital camera and lens. By maximizing the scene independent portion, a range of optimal blur radii is determined. As used herein, "blur radius" refers to the extent of a blur experienced by a pixel in an image and measured in terms of pixel(s). The blur radius depends on the focus setting and aperture setting used to capture the image. The range of optimal blur radii is used in determining the image capture instructions. Thus, the techniques described herein are characterized as being scene-independent because they are implemented without regard to the makeup of the scene to be imaged and are therefore applicable to any scene having adequate texture.

The range of optimal blur radii indicates that for areas of high frequency content (e.g., areas in the to-be-captured scene that have texture (i.e., not a flat white wall)) sufficient depth information will be available in the captured images such that a quality depth map can be generated from the images. Thus, by accounting for the range of optimal blur radii, the image capture instructions are determined in a manner that ensures sufficient depth information will be available. This also enables the image capture instructions to be generated in a manner that minimizes the number of images to be taken. The number of images to be taken is determined by determining the position of one or more focal planes within a depth range at which a captured image focused thereon will provide sufficient depth information (i.e., defocus blur). The positions of the determined focal planes thus correspond to the focus settings of the camera and the number of determined focal planes corresponds to the number of images to be taken of the scene. The focal plan determination is based on a fixed aperture setting. The position of a particular focal plane varies depending on the aperture setting of the camera. This is because aperture affects the rate at which blur increases as distance increases away from the focal plane. Thus, for a particular aperture setting of a particular camera, the image capture instructions may indicate that two images are needed for a given depth range in order to preserve sufficient depth information. However, for the same camera having a different aperture setting, the image capture instructions may indicate that three images are needed for the given depth range in order to preserve sufficient depth information.

After generation, the image capture instructions are provided to the user of the digital camera or to the user's digital camera so that the digital camera can be operated or controlled to capture the number of images suggested by the image capture instructions using the settings also suggested.

In some examples, to determine image capture instructions, a user inputs a distance estimate (e.g., two meters) characterizing the object nearest to the user in a scene to be captured. In some examples, a digital camera determines the distance estimate or the distance estimate is received using some other technique other than the user input. This distance estimate is used to determine a depth range for the scene, with the minimum depth being the distance estimate and the maximum depth being some depth greater than the minimum depth. In some examples, the maximum depth is assumed to be infinity. In some examples, the user inputs (or the camera generates) a minimum depth, a maximum depth, or both. The depth range is then divided up into depths of field, with the number of depths of field corresponding to the number of images and the location of focal planes within the depths of field corresponding to focus settings. In some examples, a set of depth values and corresponding configuration settings are evaluated over the depth range and the configuration settings that maintain about 1 to about 2 pixels of blur for the depth values are selected and outputted as the image capture instructions.

The number of images and corresponding configuration settings are determined in a manner that ensures that depths of field corresponding to the images do not substantially overlap and do not have substantial gaps. Within each depth of field interval, a maximum blur radius of about 1 to about 2 pixels is maintained for any pixel within the depth of field interval. The determination that the range of optimal blur radii should be about 1 to about 2 pixels is determined by maximizing a scene independent portion of the depth discriminability function. In doing so, it is determined that for the particular digital camera and lens combination it is optimal (i.e., ensures sufficient depth information) to have a range of optimal blur radii of about 1 to about 2 pixels. Maximizing the scene independent term of the depth discrimination function is performed prior to determining the image capture instructions. In some examples, however, maximizing the scene independent term of the depth discrimination function may be performed during calibration of the particular digital camera and lens combination. In any event, the range of optimal blur radii of about 1 to about 2 pixels is used as a constraint when evaluating a depth range based on a depth estimate to determine the image capture instructions. Having a range of optimal blur radii of about 1 to about 2 pixels ensures that for areas of high frequency content (e.g., areas in the to-be-captured scene that have texture (i.e., not a flat white wall)) sufficient depth information will be available such that a quality depth map can be generated from the images captured in accordance with the image capture instructions.

In one example, to determine the image capture instructions (i.e., focus settings, aperture settings, and number of images), the techniques described herein hold the aperture setting constant and iterate through the depth range by computing focus settings for different depth estimates such that the blur experienced by pixels within the depth range is about 1 to about 2 pixels. To begin, an initial depth estimate, $D0$, is set equal to a minimum depth of the depth range, Dmin, and a focus setting, $E0$ (i.e., a focal plane placed at a distance $E0$), is computed. The focus setting, $E0$, is computed when $E0$ is greater than $D0$ and in a manner such that the blur experienced by pixels at the initial depth estimate, $D0$, is within the range of optimal blur radii of about 1 to about 2 pixels for the focus setting $E0$. In this manner, the depth of field is centered at $E0$ and the lower depth value extends to Dmin (i.e., $D0$ because Dmin=$D0$). The determined focus setting, $E0$, can then be used to evaluate the upper range of the depth of field (e.g., extending above $E0$). This process is iteratively continued until $D0$ is greater than or equal to the maximum depth of the depth range, Dmax, or when some other condition is met (e.g., a pre-determined number of iterations have been performed, or a target quantity of images has been reached). The number of focus settings (e.g., $E0$, $E1$, etc.) needed to file the entire depth range corresponds to the number of images and the focus settings of the image capture instructions. In this example, the total number of images and corresponding focus settings are not known until the entire iteration is complete. In some examples, the focus settings are manipulated, converted, transformed, or otherwise adjusted to conform to the focus functionality available on the digital camera.

In another example, the depth range and the depth of field intervals are converted to 1/depth prior to determining the number of images and focus settings for each image. Generating the image capture instructions using 1/depth ensures that lengths of the depth of field intervals for each depth of field are the same. The depth of field intervals are then equally spaced within the depth range in a manner that ensures that there are no gaps and no overlaps of the depth of field intervals. Similar as above, in this example, the range of optimal blur radii that is used is about 1 to about 2 pixels. In this example, it is assumed that the rate of change of blur radius as a function of inverse depth is approximately constant over the depth range. This assumption should be valid for most lenses, although the rate of change may be different for different lenses. Thus for each lens, there is a lens constant $\alpha$ that represents a conversion factor between inverse depth and radius of blur. The process in this example begins by taking the total length of the depth range in inverse depth and dividing it by the maximum length of a depth of field interval within the depth range. The maximum length of the depth of field interval is determined by dividing the range of optimal blur radii by the conversion factor $\alpha$. This gives the total number of depth of field intervals within the depth range. The total length of the depth range in inverse depth is then divided by the total number of depth of field intervals to get an optimal length of each depth of field interval that will fill the entire depth range without gaps and without overlapping onto others. For each depth of field interval having the optimal length, a focus setting is determined. The number of focus settings corresponds to the number of images to be captured. Because the process in this example considers the range of optimal blur radii of about 1 to about 2 pixels when evaluating the maximum length of each depth of field interval, sufficient depth information will be available such that a quality depth map can be generated from the images captured in accordance with the image capture instructions. A quality depth map has an unambiguous depth likelihood (e.g., a likelihood that, if a depth map were generated using the particular configuration settings and from the number of images, the depth estimates would very likely be the actual real-world depths or only one depth is likely for any given set of pixels). In addition, the process in this example first determines the number of images, which corresponds to the number of depth of field intervals, and then determines the focus settings for each depth of field interval.

In accordance with techniques described herein, image capture instructions may indicate a quantity of images to be captured and corresponding configuration settings (e.g., aperture settings and focus settings) of a digital camera for capturing images for depth map generation. Images may be captured according those instructions and a depth map may then be generated using those images. A depth map generated using image capture instructions described herein includes depth information representing the distance of objects in a scene from the digital camera (i.e., a location in the real-world from where the pictures were taken). Distance values for pixels of the depth map may correspond to RGB pixels of the images. Depth maps may be used, for example, to improve existing image editing techniques. For example, depth information for an image may be used to distinguish more accurately between foreground objects and background objects in a scene. Such a distinction may be relevant to selecting objects (whether in the foreground or background) within the image. By way of illustration, an image of a scene may depict a child (e.g., a foreground element) standing in front of a tree (e.g., a background element). A user desiring to "clip" the child from the scene may indicate as such by selecting a portion of the child using an image editing application. The image editing application may use depth information associated with the image, in addition to selection cues such as color and texture, to generate an outline of the child to be clipped.

Turning now to the figures, FIG. 1 illustrates block diagram 100 showing functional components and their inputs and outputs for implementing techniques for predictively determining image capture instructions and capturing images according to those instructions for use in depth map generation as described herein. A first component is an image characteristic engine 102. As used herein, "engine" refers to a set of instructions embodied in software that, when executed on a processor, cause the processor to perform one or more functions. The image characteristic engine 102 is configured to receive depth range information 104 and camera calibration information 122. The depth range information 104 may include a user input or automatic input constituting an estimated distance of a scene, an estimated distance of an object within the scene, an estimated distance of a nearest object within the scene, an average distance of the objects in the scene, a measured distance of at least one object in the scene, a measured distance of the nearest object of the scene, and/or any other information capable of conveying the distance of one or more objects in the scene. An image of the scene to which the depth range information 104 pertains is captured using an image capture device 106. The image capture device 106 may be, for example, a camera portion of a digital single-lens reflex camera, a point-and-shoot camera, an integrated camera of a mobile device, an integrated camera of a tablet device, an integrated camera of a video camera, an integrated camera of a laptop, or any other suitable device for capturing an image or content from which an image may be extracted. In some examples, the image characteristic engine 102 receives the depth range information 104 via an input on a user device that executes or is in communication with the image characteristic engine 102. In some examples, the depth range information 104 is programmatically determined based in part on a selection of one or more "shooting modes" of the image capture device 106. For example, the image characteristic engine 102 may be implemented in an image capture device 106 comprising a digital camera and the depth range information 104 may correspond to selection of one of a variety of shooting modes (e.g., landscape, portrait, macro, indoors, outdoors, sports, etc.) of the digital camera. Each of these modes may imply a minimum distance of the scene. In some examples, a different shooting mode may be selected that implies minimum optical characteristics of the digital camera to be used by the image characteristic engine 102 to determine the image capture instructions 108. For example, a particular lens and camera combination may have two possible apertures and a minimum focus distance of 1 meter. By selecting the different shooting mode, the image characteristic engine 102 considers the two possible aperture settings and the minimum focus distance in determining the image capture instructions 108.

Once the depth range information 104 is received, the image characteristic engine 102 performs one or operations with respect to the depth range information 104 in order to determine image capture instructions 108. Examples of such operations are described with respect to FIGS. 2 and 3, for example. Ultimately, a purpose of generating the image capture instructions 108 or at least a portion thereof may be to generate a depth map from images 118(1)-118(N) captured by the image capture device 106 according to the image capture instructions 108. A depth map comprises estimates of distances of objects within the scene from the viewpoint where the images 118(1)-118(N) were captured. Thus, in some examples, the image characteristic engine 102 determines the image capture instructions 108 such that a yet-to-be-generated depth map may meet certain requirements once generated. For example, such a requirement is a certain degree of likelihood that the depths indicated by the depth map are correct (e.g., for an pixel having an actual distance of 4.5 meters, a depth map indicating that the pixel has an estimated distance between 4-5 meters may be suitable). To this end, the image characteristic engine 102 predictively determines a quantity of images 110 and configuration settings 112 needed to achieve such a depth map.

In particular, the quantity of images 110 indicates the number of images 118(1)-118(N) that should be taken using the image capture device 106 and the configuration settings 112 indicate the settings of the image capture device 106 for capturing the images 118(1)-118(N) such that sufficient depth information will be present in order to generate a quality depth map from the images 118(1)-118(N). In some embodiments, the configuration settings 112 indicate aperture settings 114 and focus settings 116 that should be used when capturing the recommended number of images identified by the quantity of images 110. The aperture settings 114 relate to the amount of light let into the camera when an image is captured. The aperture of a camera is adjusted using a mechanism of blades that adjusts the amount of light. The focus setting 116 relates to a distance of a focal plane from the image capture device 106 (e.g., a digital camera) and is adjusted accordingly. In other embodiments, the configuration settings 112 additionally or alternatively include any camera setting that can affect the level of blur in an image at different depths.

In some embodiments, when generating the image capture instructions 108, the image characteristic engine 102 associates configuration settings 112 with each image of the quantity of images 110. For example, assume that the image characteristic engine 102 determines that the quantity of images 110 that should be captured is four. The image characteristic engine 102 may also associate, with each of the four images, a particular aperture setting 114 and a particular focus setting 116. In some examples, the aperture settings 114 and the focus settings 116 for each of the four images are different. In some examples, however, at least some of the aperture settings 114 and/or at least some of the focus settings 116 are the same.

The image capture instructions 108 are then provided to the image capture device 106. The image capture device 106 is configured according to the image capture instructions 108 in order to capture the images 118(1)-118(N). Because the images 118(1)-118(N) are captured with the image capture device 106 according to the image capture instructions 108, the images 118(1)-118(N) include or are associated with configuration information 120(1)-120(N). For example, an image file may store not only data representing the image, but also data or metadata representing the configuration information 120(1)-120(N). In other examples, the configuration information 120(1)-120(N) is stored in separate files associated with the applicable image files. The configuration information 120(1) is associated with the image 118(1); the configuration information 120(2) is associated with the image 118(2), and so forth. The configuration information 120(1)-120(N) for each of the images 118(1)-118(N) includes at least the aperture setting and the focus setting used by the image capture device 106 to capture the images 118(1)-118(N).

Figure 2:
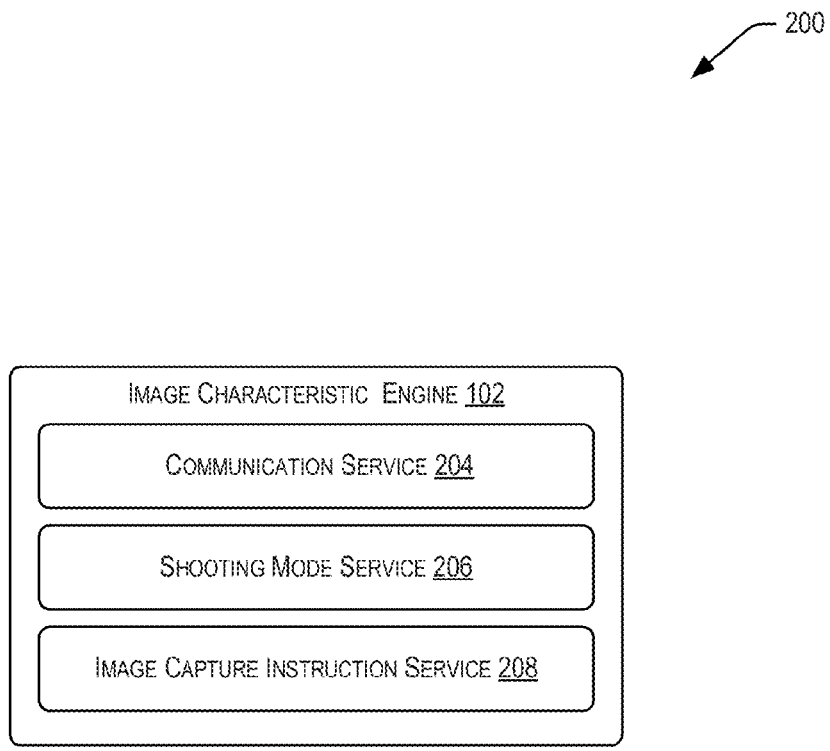
FIG. 2 is a diagram depicting an example image characteristic engine including services for implementing techniques relating to determining image capture instructions for use in depth map generation according to at least one embodiment.
Figure 4:
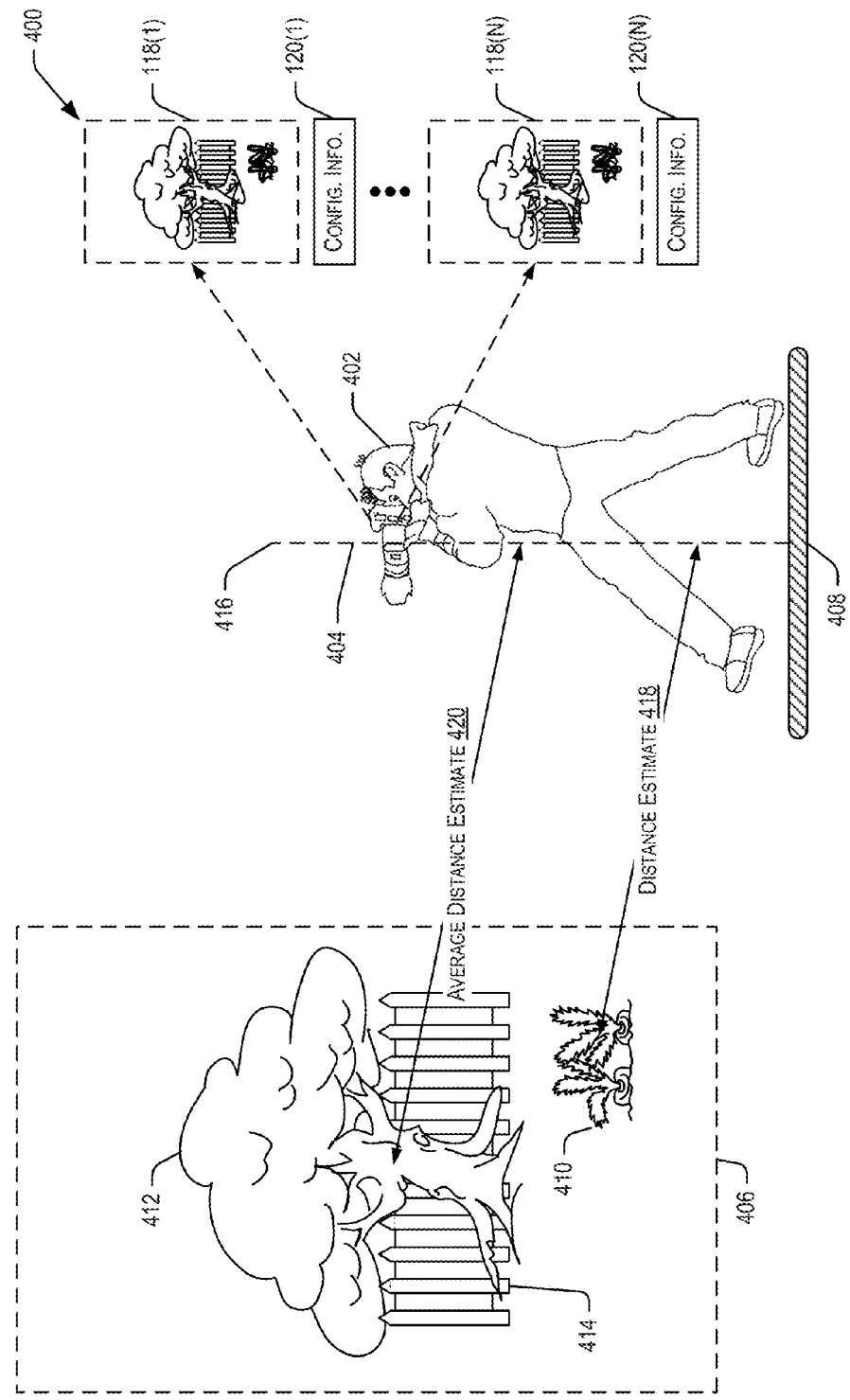
FIG. 4 is a diagram depicting an example environment including a user capturing a scene according to techniques relating to determining image capture instructions for use in depth map generation according to at least one embodiment.
Figure 6:
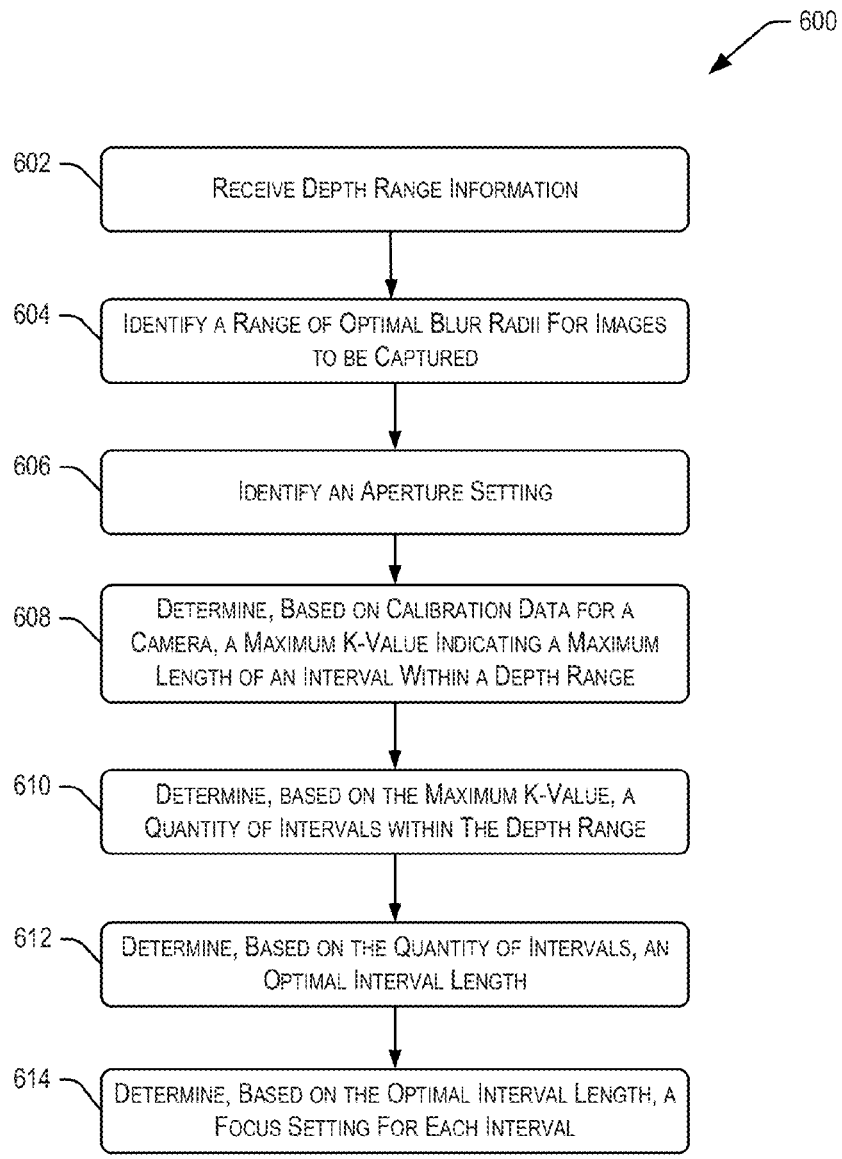
FIG. 6 is a flow chart depicting an example of a method for implementing techniques relating to determining image capture instructions for use in depth map generation according to at least one embodiment.

FIG. 2 illustrates an example configuration of an image characteristic engine 102 for generating the image capture instructions 108 for use in depth map generation as described herein. The image characteristic engine 102 may be comprised of or configured to manage one or more engines, sub-engines, modules, sub-modules, components, and/or services that implement some or all of the functionality disclosed herein for generating the image capture instructions 108. In some examples, the image characteristic engine 102 includes a communication service 204, a shooting mode service 206, and an image capture instruction service 208. While various services are illustrated in FIG. 4 and will be described as performing discrete tasks with reference to the flow charts of FIGS. 6 and 7, it is understood that FIG. 2 illustrates example configurations only and that other configurations for performing other tasks and/or similar tasks as those described herein may be implemented.

The communication service 204 is configured to manage communications between the other services of the image characteristic engine 102 and other devices or components (e.g., hardware and/or software components) that communicate with the image characteristic engine 102. For example, depth range information 104 is received by the communication service 204. In some examples, depth range information 104 is provided to another service of the image characteristic engine 102, such as the shooting mode service 206, and/or the image capture instruction service 208. The communication service 204 also receives image capture instructions 108 from the image capture instruction service 208 and provides image capture instructions 108 to other services of the image characteristic engine 102, to an operator of a digital camera (e.g., via a display screen), to a digital camera (e.g. to component(s) of the digital camera that programmatically set configuration settings), to an output device (e.g., a printer), to a storage structure associated with the image characteristic engine 102, and to other similar entities. When the image characteristic engine 102 is implemented on the same user device configured to capture images 118 and executes a depth generation engine, the communication service 204 processes requests to perform operations received from other components of that user device, including the depth generation engine and/or a depth refinement engine. When the image characteristic engine 102 is implemented as part of an online image editing service 404, the communication service 204 manages communications with one or more user devices.

The shooting mode service 206 is configured to determine the depth range information 104 based at least in part on a shooting mode of a digital camera. A shooting mode may include, for example, a landscape mode, a portrait mode, a macro mode, an indoors mode, an outdoors mode, a sports mode, and other similar modes of the digital camera. For example, when shooting in the landscape mode, a scene is likely further away than when shooting in the macro mode. Thus, the depth range information 104 may correspond to the selection of one of a user-selected mode or an auto-selected mode and the depth range information 104 may include any suitable division of distance. For example, suitable divisions of distance may include one meter to infinity, two meters to infinity, five meters to infinity, ten meters to infinity, and any other suitable division. In some examples, the shooting mode service 206 determines a lower value of the depth range information 104 and it is assumed that the larger value is infinity.

The image capture instruction service 208 is configured to predictively determine the image capture instructions 108. In some examples, this includes identifying a quantity of images 110 to be captured based on the depth range information 104 and identify appropriate configuration settings 112 for capturing the images 118 in a manner to enable generation of a quality depth map. In some examples, the image capture instruction service 208 determines image capture instructions 108 that can be used to capture the images 118, from which a depth map may be generated in which depth ambiguity for textured patches of constant depth within a hypothetical scene is eliminated or minimized. This includes, for example, evaluating a likelihood function in a manner that minimizes double peaks (i.e., where more than one depth is likely). As is known in the art, a "likelihood function" in a statistics context is defined as a function of the parameters of a statistical model. The likelihood function of a set of parameter values, θ, given outcomes x, is equal to the probability of those observed outcomes given those parameter values.

Figure 3:
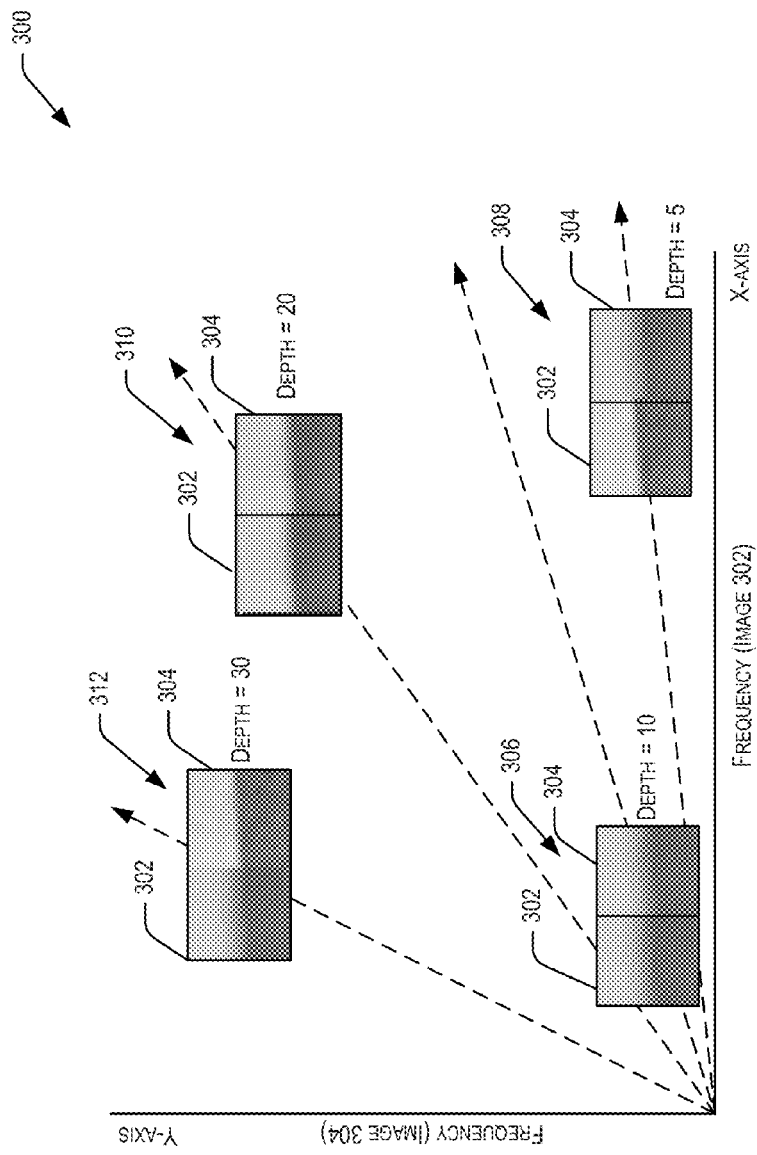
FIG. 3 is a diagram depicting an example chart including hypothetical image patches for implementing techniques relating to determining image capture instructions for use in depth map generation according to at least one embodiment.

FIG. 3 illustrates an example diagram 300 depicting a plot of frequency content evaluated for a set of two hypothetical blurry patches 302, 304 and evaluated at a variety of different depths. In some examples, the two hypothetical blurry patches 302, 304 are selected from a first hypothetical image and a second hypothetical image sharing the same set of configuration settings 112. In some examples, frequency content represents an amount of energy at a particular location within a scene at a certain frequency. For example, when an image changes rapidly from dark to light or light to dark, in a very small distance in pixels, it may have high frequency content. If changes in an image are gradual, for example, like a very slow transition from light to dark over the entire image, it may have low frequency content. the diagram 300 is used to illustrate the differences in depth discriminability between the different depths in the diagram 300.

In the example illustrated in FIG. 3, the amount of frequency content at a given frequency of the hypothetical blurry patch 302 indicates where the hypothetical blurry patch 302 is plotted as an X coordinate in (x,y) coordinates. The amount of frequency content at a given frequency of the hypothetical blurry patch 304 indicates where the hypothetical blurry patch 304 is plotted as a Y coordinate in (x,y) coordinates. Thus, the amount of frequency content corresponding to the hypothetical blurry patch 302 and the amount of frequency content corresponding to the hypothetical blurry patch 304 together comprise an (x,y) coordinates for each of the depths illustrated. For example, at a coordinate 306, the frequency contents for both of the hypothetical blurry patches 302, 304 are low (close to origin). Conversely, at a coordinate 308, the frequency content for the hypothetical blurry patch 302 is high compared to the frequency content for the hypothetical blurry patch 304 (large X value, small Y value). In some examples, the set of hypothetical blurry patches 302, 304 are evaluated at each discrete distance within a depth range identified from the depth range information 104. Each discrete distance may comprise a depth value. And using different depth values, it is determined what the set of hypothetical blurry patches 302, 304 may look like with particular configuration settings. In the hypothetical diagram 300, when the depth value is depth=5 (i.e., the coordinate 308), the frequency content for the hypothetical blurry patch 302 is greater than the frequency content for the hypothetical blurry patch 304. When the depth value is depth=10 (i.e., the coordinate 306), the frequency content for the hypothetical blurry patch 302 may about the same as the frequency content for the hypothetical blurry patch 304. Depth discriminability is determined based on the angular variation between the depths of the depth estimates. As used herein, "depth discriminability" refers to the ability to discriminate between more than one depth for a particular pixel or patch. Thus, the depth discriminability between the depth estimate of depth=10 and the depth estimate of depth=5 is high because there is a distinguishable angular variation between the two depth estimates. The same may be said for the other depth estimates, there is a distinguishable angular variation between the depth estimates. In some examples, the greater amount of frequency content at higher frequencies may make for more robust depth estimates, with less uncertainty.

An evaluation of the plot in the diagram 300 for the two hypothetical blurry patches 302, 304 may verify that, in order to have images for generating a depth map of the desired quality, at least two images 118 should be captured of the scene using a particular aperture setting 114 and two different focus settings 116, where the images will have a defocus blur of about one to two pixels. Thus, the diagram 300 may be used to verify that the different possible depths can be discriminated. In some examples, the defocus blur should be less than or equal to about a pixel and a half. This is because some defocus blur is desirable in order to preserve frequency content.

FIG. 4 illustrates an example environment 400 for implementing techniques relating to determining image capture instructions for use in depth map generation as described herein. The environment 400 includes an operator 402 utilizing a digital camera 404 to capture an image of a scene 406. The operator 402 is optional to implementing the techniques described herein. In some examples, the digital camera 404 is mounted on a tripod or other suitable device and the images of the scene 406 are captured programmatically with little or no assistance from the operator 402. The operator 402 is situated at a viewpoint 408 while the operator 402 captures the image of the scene 406. The scene 406 includes a plurality of objects 410-414. In particular, three objects of the scene 406 are illustrated in environment 400, which are carrots 410, a tree 412, and a fence 414. As illustrated, the carrots 410 appear more in the foreground of the scene 406, while the tree 412 and the fence 414 may appear more in the background. Regardless of where the objects 410-412 appear in the scene, each is defined as having a distance from the operator 402. In some examples, the distance of each object within the scene 406 is measured from a line 416 that intersects a lens of the digital camera 404. For example, the distance of the carrots 410 from the line 416 is defined by some distance estimate 418. Because, in this example, the carrots 410 are the closest object from the scene 406 that are captured using the digital camera 404, the distance estimate 418 comprises the distance of the closest object in the scene 406 from the viewpoint 408. In some examples, an average distance of the scene 406 from the line 416 is defined by an average distance estimate 420. The average distance estimate 420 includes the average of a plurality of distance estimates (e.g., a distance estimate for each of the carrots 410, the tree 412, and the fence 414). In some examples, the distance estimate 418 and the average distance estimate 420 comprise depth range information such as the depth range information 104.

In some examples, the operator 402 estimates the distance estimate 418. For example, this may include, the operator 402 estimating the distance estimate 418 without any assistance of the digital camera 404. In some examples, the operator 402 estimates the distance estimate 418 with the assistance of the digital camera 404 or some other device (e.g., a rangefinder, a tape measure, etc.). In some examples, the digital camera 404 determines the distance estimate 418 in response to an input command provided by the operator 402. For example, the digital camera 404 may include functionality (e.g., an integrated rangefinder) to estimate distances of objects or the functionality may be associated with a mode of the digital camera 404. In some examples, the distance estimate 418 is estimated and provided as depth range information 104 to another user device 402 or the image editing service 404 executing the image characteristic engine 102. In this example, the other user device 402 or image editing service 404 receives the depth range information 104 and, in accordance with techniques described herein, determines image capture instructions 108 (e.g., a quantity of images 110, aperture settings 114, and focus settings 116), which may then be provided to the operator 402 or the digital camera 404. In some examples, image capture instructions 108 are stored in a look-up table which is accessible by the operator 402 and/or the digital camera 404. For example, a hardcopy of a portion of the look-up table may be provided to the operator 402 and the operator 402 may manually adjust the configuration settings of the digital camera 404 to capture one or more images 118 in accordance with the image capture instructions 108. In some examples, the image capture instructions 108 for a plurality of distance ranges are determined and stored in a memory of the digital camera 404 or other user device 402. In some examples, the image capture instructions 108 are particular to the digital camera 404, a type of digital camera 404, a lens of the digital camera 404, a combination of a lens and the digital camera 404. In some examples, the digital camera 404 comprises a camera body and a lens and the image capture instructions 108 are tailored to combinations of camera bodies and lenses based on calibration data for the digital camera 404.

In some examples, the configuration settings are stored in association with the images 118(1)-118(N) as configuration information 120(1)-120(N). In some examples, the operator 402 inputs a distance estimate 418 into the digital camera 404. The digital camera 404 may execute an image characteristic engine 102 which receives the distance estimate 418 as input of the depth range information 104. The image characteristic engine 102 then outputs for the operator (e.g., via a display screen) image capture instructions 108, including a quantity of images to be captured 110, an aperture setting 114 for each image, and a focus setting 116 for each image. To capture the images 118, the operator 402 first adjusts the digital camera 404 according to a first aperture setting (selected out of, for example, f/1.2, f/2, f/4, f/5.6, f/8, f/16, f/22 or other suitable aperture settings) corresponding to a first recommended image as identified by the image capture instructions 108. The operator 402 then focuses the digital camera 404 according to a first focus setting corresponding to the first recommended image as identified by the image capture instructions 108 and captures the scene 406 using the digital camera 404. The image 118(1) is a result of the scene 406 being captured. The operator 402 then adjusts the digital camera 404 according to a second aperture setting (selected out of, for example, f/1.2, f/2, f/4, f/5.6, f/8, f/16, f/22 or other suitable aperture settings) corresponding to a second recommended image as identified by the image capture instructions 108. The operator 402 then focuses the digital camera 404 according to a second focus setting corresponding to the second recommended image as identified by the image capture instructions 108 and captures the next image 118(2) of the scene 406 using the digital camera 404. In some examples, the operator 402 captures more images with the same or different aperture settings 114 and focus settings 116. The images 118(1)-118(N) are then be used by a depth generation engine (e.g., the depth generation engine 412(A) or 412(B)) to output one or more depth maps.

By using the techniques relating to image capture instructions described herein, it may be determined that when a larger depth range is present in a scene, a greater number of images 118 are needed to be captured in order to adequately preserve frequency content. For example, for a depth range of two meters to infinity, two images may not be adequate to preserve frequency content. For such a depth range, it may be desirable to divide up the depth range, and treat each division as its own individual depth range, which may involve capturing more than two images in total. Thus, in some examples, image capture instructions 108 may indicate that a frequency preserving set of images 118 should be captured. In some examples, the image capture instructions 108 may indicate that for a depth range of two meters to infinity, four pictures should be taken with different aperture settings 114. In some examples, the image capture instructions 108 may also indicate that for three meters to infinity, three pictures should be taken with different aperture settings 114. For distances beginning with five meters and above, in some examples, the image capture instructions 108 may indicate that two images 118 should be taken.

In some examples, the image characteristic engine 102 determines the image capture instructions 108 in accordance with the following examples. The following examples also illustrate, in more detail, how to evaluate a depth likelihood function, how to use frequency content to determine image capture instructions 108, and the like. In some cases, the following examples are intended to supplement the discussion above regarding generation of the image capture instructions 108 for creation of quality depth maps. In some examples, a quality depth map is a depth map that avoids significant double peaks in a likelihood function. Thus, in some examples, the image capture instructions 108 indicate a quantity of images 110 to be taken and the configuration settings 112 that should be used to capture them such that, for an image patch, the energy function $\epsilon(d|\{i_n\})$ at its ground-truth depth $\hat{d}$ is much smaller than the energy function at any other hypothetical depth $d: d \neq \hat{d}$.

Given a specific set of focus settings 116 and aperture settings 114, the input images 118 $\{i_n\}$ may depend on not only these configuration settings 112, but also on image noise. Accordingly, a likelihood function can be decomposed into a determinant and a stochastic part:

$$\epsilon(d \mid \{i_n\}) = \tag{1}$$

$$\epsilon(d \mid h, \hat{d}, \{f_n\}, \{a_n\}, \epsilon) = -\underbrace{\sum_{\xi} \frac{\|H(\xi)\|^2}{\eta^2} \frac{\Sigma_n \|\hat{\Psi}_n(\xi)\Psi_n(\xi)\|^2}{\Sigma_n \|\hat{\Psi}_n(\xi)\|^2} + \sum_{\xi} \log\left(\sum_n \|\Psi_n(\xi)\|^2\right)}_{\epsilon_{det}(d|h,\hat{d},\{f\},\{a\})}$$

$$\underbrace{-\sum_{\xi} \frac{\|\Sigma_n \Psi_n(\xi) N_n(\xi)\|^2}{\Sigma_m \|\Psi_m(\xi)\|^2} - \sum_{\xi} 2 \frac{\Sigma_m \hat{\Psi}_m(\xi) \Psi_m(\xi)}{\Sigma_m \|\Psi_m(\xi)\|^2} \cdot \text{real}\left(\frac{H(\xi)}{\eta^2} \sum_n \overline{N_n(\xi)} \Psi(\xi)\right)}_{\epsilon_{stoc}(d|h,\hat{d},\{f\},\{a\})}$$

Here $\hat{\psi}_n$ and $\psi_n$ may correspond to ground-truth and hypothetical defocus OTF (Fourier transform of defocus blur kernel), which may be decided by not only the depths d or $\hat{d}$ but also the focus settings $\{f_n\}$ 114 and aperture settings $\{a_n\}$ 116. The variables H($\xi$) and $N_n$ ($\xi$) denote Fourier transform of the all-in-focus image and may denotes noise respectively.

Although due to the stochastic term there may be challenges completely eliminating ambiguity, however, the likelihood function can be defined to be weakly unimodal when the deterministic term contrasts the likelihood of a wrong depth hypothesis significantly from that of the ground-truth depth:

In some examples, the depth information provided by the scene and configuration setting tuple (h, $\{f_n\}$, $\{a_n\}$) over a set of depth hypothesis D as may be defined as:

$$\tau(h, \{f_n\}, \{a_n\}) = \min_{d, \hat{d} \in D} \varepsilon_{det}(d|h, \hat{d}, \{f_n\}, \{a_n\}) - \varepsilon_{det}(\hat{d}|h, \hat{d}, \{f_n\}, \{a_n\}). \quad (2)$$

In some examples, the first phase may include optimizing $\{f_n\}$ and $\{a_n\}$ regardless of texture of the scene. After a few images have been captured and additional knowledge about the all-in-focus image scene texture h, $\{f_n\}$ and $\{a_n\}$ may be optimized conditioned on knowledge about h.

The depth information in Eq. 2 may be bounded by:

$$\tau(h, \{f_n\}, \{a_n\}) \geq \left(\sum_\xi \frac{\|H(\xi)\|^2}{\eta^2}\right) \cdot \min_\xi \breve{\gamma}_\xi \sin^2 \breve{\varphi}_\xi + \sum_\xi \log \frac{\hat{\gamma}_\xi}{\breve{\gamma}_\xi} \quad (3)$$

where $$\hat{\gamma}_\xi = \max_\Psi \sum_n \|\Psi_n(\xi)\|^2, \quad \breve{\gamma}_\xi = \min_\Psi \sum_n \|\Psi_n(\xi)\|^2 \quad (4)$$

$$\breve{\varphi}_\xi = \min_{\Psi, \hat{\Psi}} \arccos \frac{\sum_n (\xi) \Psi_n(\xi)}{\sqrt{\sum_n \|\Psi_n(\xi)\|^2} \sqrt{\sum_n \|\Psi_n(\xi)\|^2}} \quad (5)$$

A proof sketch may denote that:

$$\gamma(d) = \sum_n \|\Psi_n(\xi)\|^2 \quad (6)$$

$$\varphi_\xi(\Psi, \hat{\Psi}) = \arccos \frac{\sum_n \hat{\Psi}_n(\xi) \Psi_n(\xi)}{\sqrt{\sum_n \|\hat{\Psi}_n(\xi)\|^2} \sqrt{\sum_n \|\Psi_n(\xi)\|^2}} \quad (7)$$

And the following may be shown.

$$\varepsilon_{det}(d|h, \hat{d}, \{f_n\}, \{a_n\}) - \varepsilon_{det}(\hat{d}|h, \hat{d}, \{f_n\}, \{a_n\}) = \quad (8)$$

$$\sum_\xi \frac{\|H(\xi)\|^2}{\eta^2} \left(\sum_n \|\hat{\Psi}_n(\xi)\|^2\right) \sin^2 \varphi_\xi(\Psi, \hat{\Psi}) + \sum_\xi \log \frac{\sum_n \|\hat{\Psi}_n(\xi)\|^2}{\sum_n \|\Psi_n(\xi)\|^2}$$

In some examples, a sequence of depth hypothesis D is considered, and minimal energy discriminative power is computed over all pairs of $\hat{d}$ and d in D:

$$\tau(h, \{f_n\}, \{a_n\}) \geq \sum_\xi \frac{\|H(\xi)\|^2}{\eta^2} \breve{\gamma}_\xi \sin^2 \breve{\varphi}_\xi + \sum_\xi \log \frac{\breve{\gamma}_\xi}{\gamma_\xi} \geq \quad (9)$$

$$\left(\sum_\xi \frac{\|H(\xi)\|^2}{\eta^2}\right) \cdot \min_\xi \breve{\gamma}_\xi \sin^2 \breve{\varphi}_\xi + \sum_\xi \log \frac{\breve{\gamma}_\xi}{\gamma_\xi}$$

In some examples, certain theorems discussed herein may allow correct depth estimation for many possible patches, when configuration settings 112 are chosen by maximizing $\breve{\gamma}$, $\breve{\varphi}$ and $$\frac{\breve{\gamma}_\xi}{\gamma_\xi}$$

and $\breve{\gamma}_\xi$ for all frequencies $\xi$ where H ($\xi$) is significant. It may be desirable that the trajectory of ($\psi_1$($\xi$), $\psi_2$ ($\xi$), . . . ($\xi$), $\psi_N$ ($\xi$)) lie uniformly on the surface of the unit sphere for these significant frequencies. When there is little or no information regarding the distribution of H ($\xi$), it may be desirable to maximize $$\breve{\gamma}_\xi \sin^2 \breve{\varphi}_\xi + \log \frac{\breve{\gamma}_\xi}{\gamma_\xi}$$

for all frequencies.

In some examples, the defocus-invariant texture may be significantly different from periodic, and therefore may not be directly applied to theorems discussed herein. In some examples, the images may be prefiltered with Laplacians to make the scene texture more periodic. In this case $\|H(\xi)\|^2$ may no longer be a measurement of intensity variance in the sharp texture, but may instead measure the significance of depth-variant component in the scene texture.

In some examples, theorems discussed herein may imply certain things about selecting configuration settings. For example, to learn what may be implied it may be desirable to first express $\psi_n$ ($\xi$) in terms of the blur kernel radius $\sigma_n$, $$\Psi_n(\xi) \approx K_n(\xi) = A(\sigma_n \xi) = \frac{2\beta_1(\sigma_n \xi)}{\sigma_n \xi} \quad (10)$$

Here A denotes the airy function and $B_1$ denotes the first-order Bessel function.

In selecting configuration settings 112 for a pair of images, an optimal pair of configuration setting for depth acquisition may be considered. The relationship of defocus kernel radius in two images sharing the same depth may satisfy:

$$\sigma_2 = \frac{(a_1 C_2 D_2)/(a_2 C_1 D_1)}{1 + \frac{B_2 - B1}{D_1}\left(\frac{\sigma_1}{C_1} - \frac{a_{ref}}{a_1}\right)} \sigma_1 + \quad (11)$$

-continued $$\frac{a_{ref}}{a_2} C_2 \left(1 - \frac{D_2/D_1}{1 + \frac{B_2 - B_1}{D_1}\left(\frac{\sigma_1}{C_1} - \frac{a_{ref}}{a_1}\right)}\right)$$

Empirically, it may be observed that for the same aperture velocity of defocus kernel radius change w.r.t. inverse depth for focus setting is approximately the same $$\frac{C_2 D_2}{C_1 D_1} \approx 1 \qquad (12)$$

and the distance between reference depth plane and aperture image on the object side may not change much, i.e. $B_1 \approx B_2$, and thus $$1 + \frac{B_2 - B_1}{D_1}\left(\frac{\sigma_1}{C_1} - \frac{a_{ref}}{a_1}\right) \approx 1 \qquad (13)$$

Thus, Eq. 11 may simplify into $$\sigma_2 = \frac{a_1}{a_2}\sigma_1 + \frac{a_{ref}}{a_2}(C_2 - C_1) \qquad (14)$$

A plot may then be developed for each frequency the trajectory $(A(\sigma_1 \xi), A(\sigma_2 \xi))$ with various $$\frac{a_1}{a_2} \text{ and } \frac{a_{ref}}{a_2}(C_2 - C_1)\xi.$$

It may be observed that both $\gamma_\xi$ and $\varphi_\xi$ are minimized when $$a_1 = a_2 \qquad (15)$$

and $$\pi = \frac{a_{ref}}{a_2}(C_2 - C_1)\xi = (\sigma_2 - \sigma_1)\xi \qquad (16)$$

In practice, it may be desirable to obtaining depth information from high frequencies, e.g. $\pi/2 \le \xi \le \pi$, so that high spatial resolution may be guaranteed. Thus, as mentioned above, it may be desirable to have a difference in defocus level between the two images to be 1~2 pixels.

Note that even in such situations, $\gamma_\xi$ and $\varphi_\xi$ significantly decreases when either $\sigma_1 \xi$ or $\sigma_2 \tau$ go out of the range of $[-\pi, \pi]$. This may correspond to limiting the defocus blur radius of both images within 1~2 pixels.

In some examples, for a very wide depth range of interest, it may be impossible to achieve the above condition even with the smallest aperture. Thus, is some examples, the image capture instructions 108 may indicate that multiple images be captured having the same focus settings 116. In some examples, a straight-forward choice may be to capture a frequency-preserving focal stack of the scene. In some examples, the image capture instructions 108 may indicate that a focal stack should be captured. In some examples, this may mean that images 118 should be captured with the same aperture setting 114, and have focus settings 116 uniformly distributed within the focal range of interest. In some examples, for each depth of interest, a corresponding defocus blur may be less than 1.5 pixels in at least two images.

In some examples, the image capture instructions 108 for acquiring the images 118 for depth maps may be the same as for acquiring an all-in-focus image. Therefore, in some examples, by capturing the images 118 in accordance with the image capture instructions 108, a depth map and an estimation of the all-in-focus image may be generated. Unlike conventional methods, the image capture instructions 108 may not indicate that a dense focal stack of images should be taken. Instead, to reduce computational cost, it may be desirable that smaller apertures settings are used in order to reduce the number of images 118. In some examples, from a user-specified depth range of interest identified from the depth range information 104, optimal configuration settings 112—regardless of the scene texture—may be identified, with the least number of images 118 to be captured. The following data corresponds to the number of images and their corresponding aperture for various depth ranges using calibration data of a Canon EF50 mm 1.2L lens, according to one example.

a. When depth range information 104 indicates that the closest object in a scene is between two meters and infinity, take four images.
b. When depth range information 104 indicates that the closest object in a scene is beyond three meters, take three images.
c. When depth range information 104 indicates that the entire scene is beyond five meters, take two images.

In some examples, the images 118 identified above may be captured using relatively small apertures. For example, for many outdoor scenes an aperture smaller than f/8 may provide for suitable results. Even for very far scenes, the largest aperture chosen may still be smaller than f/2.2, which may be one of the largest possible apertures on cellphones.

Figure 5:
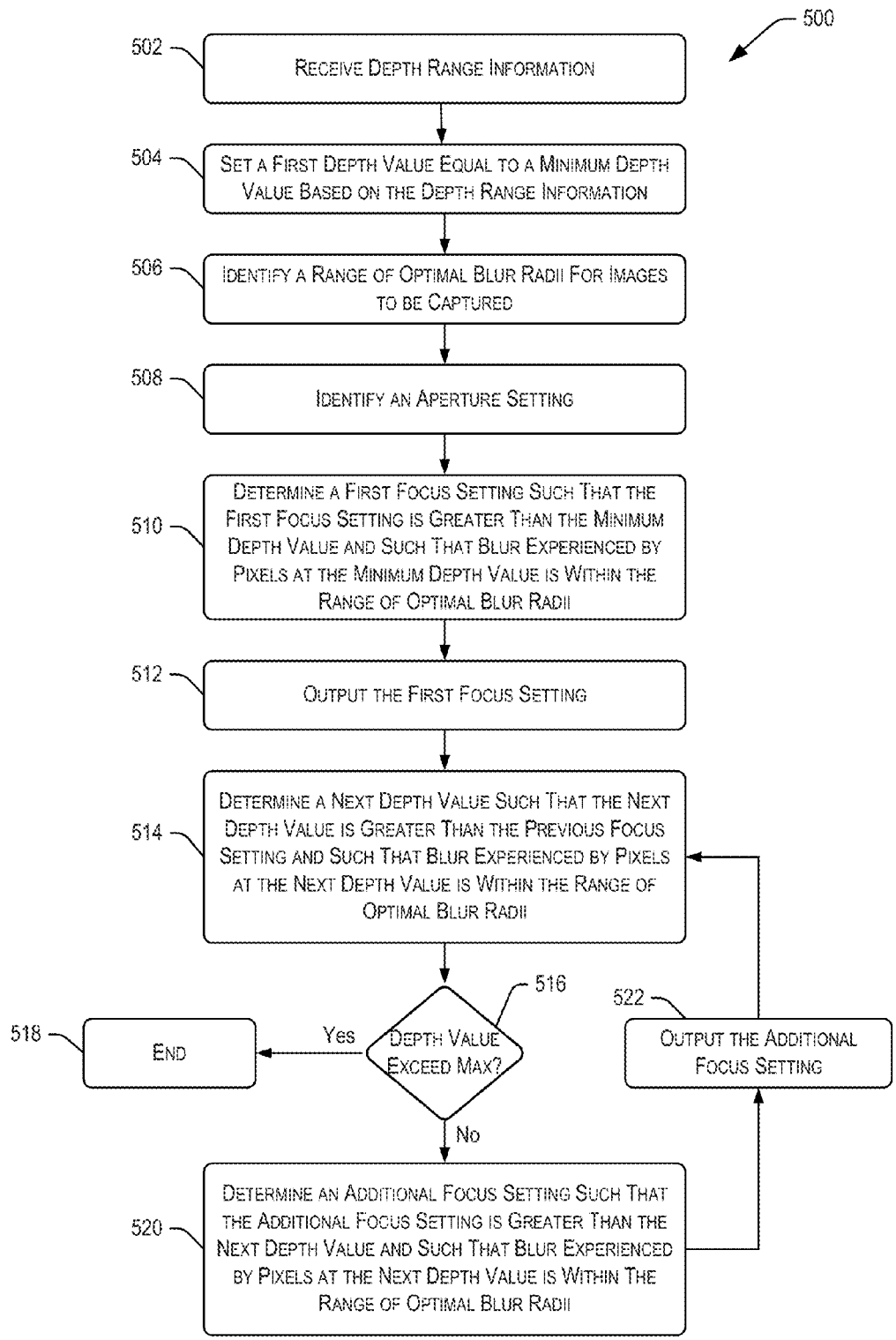
FIG. 5 is a flow chart depicting an example of a method for implementing techniques relating to determining image capture instructions for use in depth map generation according to at least one embodiment.

The following discussion describes example acts and/or procedures that may be performed using techniques described herein, in accordance with at least one example. FIG. 5 depicts process 500 including example functions relating to determining image capture instructions for use in depth map generation as described herein. Some or all of the process 500 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The image characteristic engine 102 (FIG. 1), whether implemented in one of the user devices 402(1)-402(N) (FIG. 4) or within the image editing service 404 (FIG. 4), may perform the process 500 of FIG. 5. In some examples, the process 500 is suitable a camera having any lens following any suitable lens model. For example, the process 500 may be suitable for lens following a thick-lens model or a thin-lens model.

The process 500 begins at 502 by receiving depth range information. The depth range information may comprise a distance estimate. Receiving the distance estimate may include receiving the distance estimate comprising an estimate of the nearest object within a scene. In some examples, the distance estimate may indicate an average distance of the scene. In some examples, the distance estimate may comprise a distance of a portion of the scene from a viewpoint. In some examples, the depth range information may be used to identify a depth range. For example, the depth range information may indicate a minimum depth (e.g., two meters) and a maximum depth may be estimated. In some examples, the depth range information indicate both the minimum depth and the maximum depth. One or both of these depths may be inputted by a user or gathered using devices or automatic methods. In some examples, the depth range is divided into a set of discrete depth values. At least a portion of the set of depth values are evaluated by the process 500 to determine focus settings, aperture settings, and a minimal quantity of images. In some examples, the depth range information comprises an input of a target quantity of images. The target quantity of images may indicate the number of images the user is willing to take, or the number of images that can possible be taken by the camera within a certain time threshold (e.g., five seconds). In some examples, the process 500 considers the target quantity of images while determining the image capture instructions and adjusts the output accordingly. In some examples, this may result in depth information exceeding or falling short of the range of optimal blur radii. In some examples, when the target quantity of images exceeds the minimal quantity of images, there may overlaps in the depths of field and/or excess depth information. In some examples, when the target quantity of images is fewer than the minimal quantity of images, there may be gaps in the depths of field and/or a deficiency of depth information.

At 504, the process 500 sets a first depth value equal to a minimum depth value based on the depth range information. For example, if the depth range information indicates a depth range (e.g., two meters to fifty meters), the first depth value is two meters. In this manner, the process 500 begins with the smallest depth and iterates through all the depth values until a depth value that is greater than a maximum depth (e.g., fifty meters) is reached.

At 506, the process 500 identifies a range of optimal blur radii for images to be captured. In some examples, the range of optimal blur radii is determined prior to the execution of the process 500. For example, the range of optimal blur radii may be pre-computed and provided to a computer executing the process 500. In some examples, the range of optimal blur radii is determined in part by evaluating a scene independent portion of a depth discrimination function including a scene dependent portion and the scene independent portion. The scene independent portion is independent of the scene because it relies on calibration data for a digital camera used to capture the images, and not the underlying scene. In some examples, the depth discrimination function comprises equation (3) as described herein. The depth discriminability function is evaluated in a manner that maximizes the scene independent portion of the depth discriminability function. In some examples, the range of optimal blur radii is factored into the determination of the image capture instructions in order to ensure that there will be sufficient depth information such that a quality depth map can be generated from the captured images. In this manner, the image capture instructions are determined in a way that maximizes the amount of depth information, but also minimizes the number of images to be captured. In some examples, the range of optimal blur radii is about 1 to about 2 pixels.

At 508, the process 500 identifies an aperture setting. In some examples, the same aperture setting may be used for at least two of the images to be captured. In some examples, the aperture setting is one of the smallest allowable aperture settings based on the available aperture settings of the camera.

In some examples, the aperture setting is optimally chosen as part of evaluating the scene independent portion of the depth discriminability function. The aperture setting may be greater than the smallest allowable aperture in some examples. In some examples, the process 500 is evaluated using different aperture settings at 508. In this manner, the focus settings may be determined for different aperture settings.

At 510, the process 500 determines a first focus setting such that the first focus setting is greater than the minimum depth value and such that blur experienced by pixels at the minimum depth value is within the range of optimal blur radii in an image captured using the aperture setting and the first focus setting. In some examples, this may include computing the first focus setting in a manner that considers the amount of depth information that will be available at other positions within the image.

At 512, the process 500 outputs the first focus setting. In some examples, this includes storing the first focus setting. In some examples, the first focus setting is outputted to table of focus settings. This may include capturing an image using the first focus setting and the aperture setting. In some examples, outputting the first focus setting may include generating an image capture instruction including the first focus setting.

At 514, the process 500 determines a next depth value such that the next depth value is greater than the previous focus setting and such that blur experienced by pixels at the next depth value is within the range of optimal blur radii in an image captured using the aperture setting and a focus setting corresponding to the next depth value. For example, if the previous focus setting (e.g., the first focus setting) was at three meters, the next depth value that is selected is greater than three meters.

At 516, it is determined whether the next depth value is greater than or equal to the maximum depth value. In some examples, the maximum depth value corresponds to the depth range determined from the depth range information. If yes, the process 500 ends at 518. If no, the process continues to 520 where the process 500 determines an additional focus setting such that the additional focus setting is greater than the next depth value and such that blur experienced by pixels at the next depth value is within the range of optimal blur radii in an image captured using the aperture setting and the additional focus setting.

At 522, the process 500 outputs the additional focus setting. In some examples, this includes storing the additional focus setting. In some examples, the additional focus setting is outputted to table of focus settings. This may include capturing an image using the first focus setting and the aperture setting. In some examples, outputting the additional focus setting may include generating an image capture instruction including the additional focus setting. After outputting the additional focus setting at 522, the process returns to 514 and determines a next depth value such that the next depth value is greater than the previous focus setting and such that blur experienced by pixels at the next depth value is within the range of optimal blur radii in an image captured using the aperture setting and a focus setting corresponding to the next depth value.

The following discussion describes example acts and/or procedures that may be performed using techniques described herein, in accordance with at least one example. FIG. 5 depicts process 500 including example functions relating to determining image capture instructions for use in depth map generation as described herein. The image characteristic engine 102 (FIG. 1), whether implemented in one of the user devices 402(1)-402(N) (FIG. 4) or within the image editing service 404 (FIG. 4), may perform the process 600 of FIG. 6.

In some examples, all or part of the process 600 may be computed using inverse depth (i.e., 1/depth) measurements. In some examples, the process 600 is simpler than the process 500 because the process 600 determines the minimal quantity of images upfront and spaces the depths of field evenly over the depth range.

The process 600 begins at 602 by receiving depth range information. The depth range information may comprise a distance estimate. Receiving the distance estimate may include receiving the distance estimate comprising an estimate of the nearest object within a scene. In some examples, the distance estimate may indicate an average distance of the scene. In some examples, the distance estimate may comprise a distance of a portion of the scene from a viewpoint. In some examples, the depth range information may be used to identify a depth range. For example, the depth range information may indicate a minimum depth (e.g., two meters) and a maximum depth may be estimated. In some examples, the depth range information indicates both the minimum depth and the maximum depth. One or both of these depths may be inputted by a user or gathered using devices or automatic methods. In some examples, the depth range information comprises an input of a target quantity of images. The target quantity of images may indicate the number of images the user is willing to take, or the number of images that can possible be taken by the camera within a certain time threshold (e.g., five seconds). In some examples, the process 500 considers the target quantity of images while determining the image capture instructions and adjusts the output accordingly. In some examples, this may result in depth information exceeding or falling short of the range of optimal blur radii. In some examples, when the target quantity of images exceeds the minimal quantity of images, there may overlaps in the depths of field and/or excess depth information. In some examples, when the target quantity of images is fewer than the minimal quantity of images, there may be gaps in the depths of field and/or a deficiency of depth information.

At 604, the process 600 identifies a range of optimal blur radii for images to be captured. In some examples, the range of optimal blur radii is determined prior to the execution of the process 600. For example, the range of optimal blur radii may be pre-computed and provided to a computer executing the process 600. In some examples, the range of optimal blur radii is determined in part by evaluating a scene independent portion of a depth discrimination function including a scene dependent portion and the scene independent portion. The scene independent portion is independent of the scene because it relies on calibration data for a digital camera used to capture the images, and not the underlying scene. In some examples, the depth discrimination function comprises equation (3) as described herein. The depth discriminability function is evaluated in a manner that maximizes the scene independent portion of the depth discriminability function. In some examples, the range of optimal blur radii is factored into the determination of the image capture instructions in order to ensure that there will be sufficient depth information such that a quality depth map can be generated from the captured images. In this manner, the image capture instructions are determined in a way that maximizes the amount of depth information, but also minimizes the number of images to be captured. In some examples, the range of optimal blur radii is about 1 to about 2 pixels.

At 606, the process 600 identifies an aperture setting. In some examples, the same aperture setting may be used for at least two of the images to be captured. In some examples, the aperture setting is one of the smallest allowable aperture settings based on the available aperture settings of the camera. In some examples, the aperture setting is optimally chosen as part of evaluating the scene independent portion of the depth discriminability function. The aperture setting may be greater than the smallest allowable aperture in some examples. In some examples, the process 600 is evaluated using different aperture settings at 606. In this manner, the focus settings may be determined for different aperture settings.

At 608, the process 600 determines a maximum K-value based on calibration data for the camera. The K-value indicates the maximum length of an interval in a depth range. In some examples, the depth range is determined based on the depth range information. In some examples, the camera calibration data includes the range of optimal blur radii and a lens constant, a. In particular, the maximum K-value may be determined by dividing the length of the depth range by the range of optimal blur radii divided by the lens constant α. The lens constant α represents a conversion factor between inverse depth and radius of blur (e.g., blur kernels). The blur kernels are identified from a mapping of calibration settings (e.g., aperture and focus) and depth to blur kernels. The mapping is derived from a calibration of the camera. In this example, lens constant α is based on the assumption that the rate of change of blur radius as a function of inverse depth is approximately constant over the depth range. In the thick lens model example in equation (12), the lens constant α represents the approximately constant product $C\_f*D\_f$ over the depth range for the thick lens parameters $C\_f$ and $D\_f$.

At 610, the process 600 determines, based on the maximum K-value, a quantity of intervals within the depth range, The quantity of intervals corresponds to a minimal quantity of images suggested. In some examples, each interval corresponds to a depth of field interval. Thus, the quantity of intervals is the number of depths of field that will completely pack the depth range, without any gaps and without overlapping depths of field. In some examples, the depths of fields are equally spaced throughout the depth range. In some examples, the quantity of intervals corresponds to the minimal quantity of images because an image is designated for each interval in the depth range. Thus, the correspondence may be one-to-one. In some examples, there are more intervals than images and vise-versa.

At 612, the process 600 determines, based on the quantity of intervals, an optimal interval length. In some examples, the optimal interval length is based on the quantity of the set of intervals. In this manner, the optimal interval length of each interval is the total length of the depth range (e.g., minimum depth minus maximum depth) divided by the quantity of intervals.

At 614, the process 600 determines, based on the optimal length of the each interval, a focus setting for each image of the minimal quantity of images. In some examples, the focus setting for each image corresponds to a focal plane placed at the midpoint of each interval of the set. In some examples, the determined focus settings are converted or otherwise adjusted to conform with the focus settings available on the camera. In some examples, the focus settings are output in the form of an array that includes a focus setting for each of the minimal images. In some examples, each image of the minimal quantity of images corresponds to the aperture setting. In some examples, the aperture setting is the same aperture setting for a portion of the minimal quantity of images. In some examples, the focus setting and the aperture setting for each image of the minimal quantity of images are used by the camera to capture the minimal quantity of images.

Figure 7:
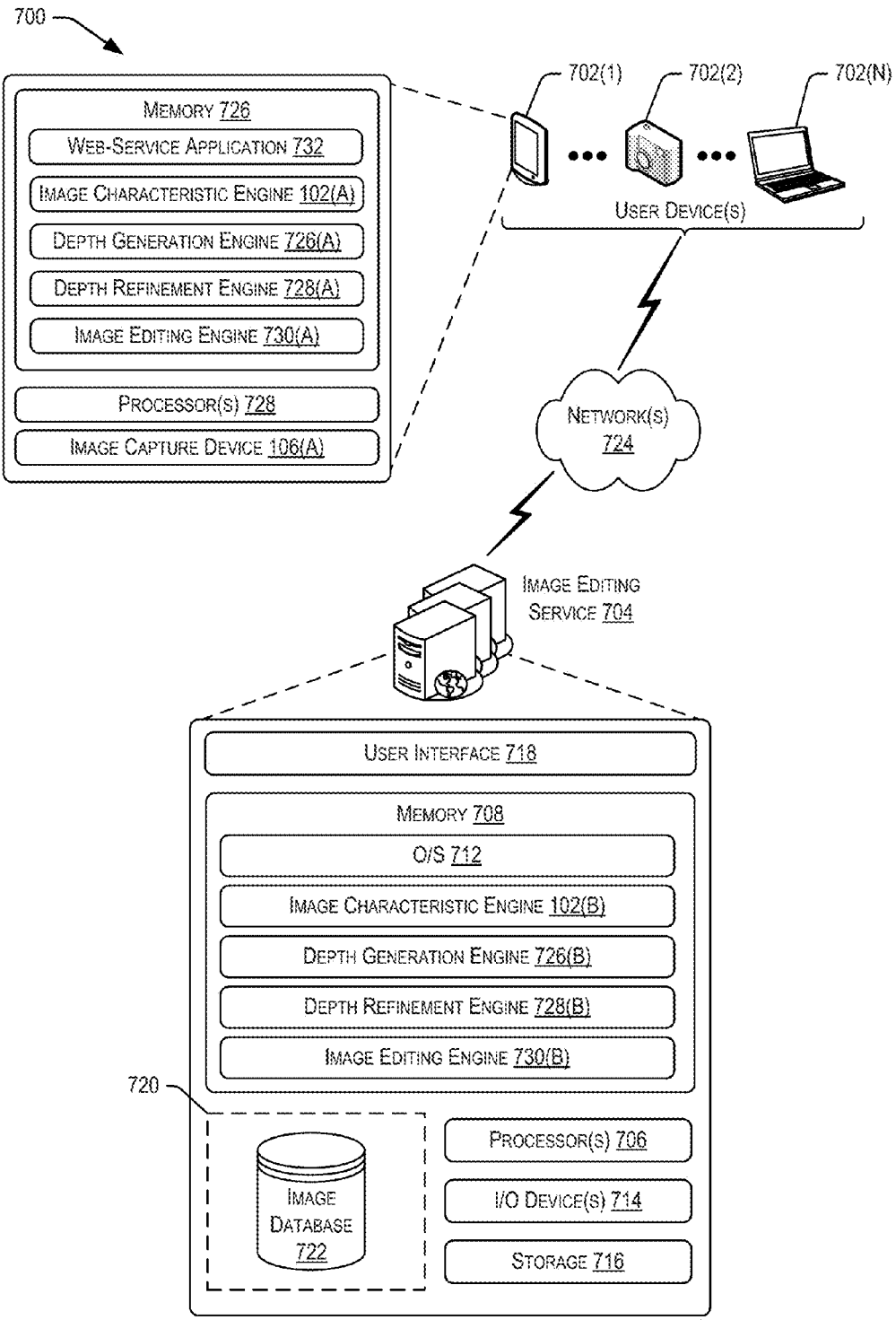
FIG. 7 is a diagram depicting an example network environment including example user devices and an example image editing service for implementing techniques relating to determining image capture instructions for use in depth map generation according to at least one embodiment.

FIG. 7 illustrates example architecture 700 for implementing techniques relating determining image capture instructions for use in depth map generation as described herein. The architecture 700 includes one or more user devices 702(1)-702(N) (hereinafter, "the user device 702") in communication with an image editing service 704 via networks(s) 724 (hereinafter, "the network 724"). The network 724 includes any one or a combination of many different types of networks, such as cable networks, the Internet, wireless networks, cellular networks, radio networks, and other private and/or public networks.

The user device 702 comprises any suitable device capable of capturing an image and/or performing one or more operations on images. In some examples, the user device 702 is any suitable computing device such as, but not limited to, digital camera, a mobile phone, a smart phone, a personal digital assistant (PDA), a laptop computer, a personal computer, a desktop computer, a set-top box, a thin-client device, or other computing device. The user device 702 is utilized by one or more users (not shown) for interacting with the image editing service 704.

The user device 702 therefore includes a processor 728 that is communicatively coupled to a memory 726 and that executes computer-executable program code and/or accesses information stored in the memory 726. In some examples, the memory 726 stores a web-service application 732 and one or more engines (e.g., the image characteristic engine 102, a depth generation engine 726(A), a depth refinement engine 728(A), an image editing engine 720(A)). The processor 728 comprises a microprocessor, an application-specific integrated circuit ("ASIC"), a state machine, or other processing device. The processor 728 may also include any of a number of processing devices, including one. Such a processor can include or may be in communication with a computer-readable medium storing instructions that, when executed by the processor 728, cause the processor to perform the operations described herein. The web-service application 732 may enable the user to interact with the image editing service 704 over the network 724. The user device 702 also comprises an image capture device 106(A). The image capture device 106(A) is configured to capture one or more images. In some examples, the image capture device 106(A) comprises a conventional digital camera including a lens, aperture setting, focus setting, an infrared projector, and/or a structured light device. Any uses of "digital camera" throughout this specification are for illustrative purposes only and a person of ordinary skill in the art would understand that such term may generally be used to refer to any image capture device 106 executed by or integrated with any one of the user devices 702(1)-702(N) or any similar device. Therefore, the terms "digital camera" and "user device" may sometimes be used generically and interchangeably herein. In some examples, the user device 702(1) is a digital camera and may be configured with the image capture device 106(A) in order to capture images, but may not include any or some of the engines. In this example, the user device 702(1) (or an operator of the user device 702(1)) is provided with image capture instructions 108 to use while capturing the images 118 using the image capture device 106(A).

The image editing service 704 includes a processor 706 that is communicatively coupled to a memory 708 and that executes computer-executable program code and/or accesses information stored in the memory 708. In some examples, the memory 708 stores an operating system 712 and one or more engines (e.g., the image characteristic engine 102, the depth generation engine 726(B), the depth refinement engine 728(B), and the image editing engine 720(B)). The operating system 712 comprises any suitable operating system configured for interacting with the image editing service 704. The processor 706 comprises a microprocessor, an ASIC, a state machine, or other processing device. The processor 706 also comprises any of a number of processing devices, including one. Such a processor can include or may be in communication with a computer-readable medium storing instructions that, when executed by the processor 706, cause the processor to perform the operations described herein.

The memory 708 comprises any suitable computer-readable medium. The computer-readable medium may include any electronic, optical, magnetic, or other storage device capable of providing a processor with computer-readable instructions or other program code. A computer-readable medium may include, for example, a magnetic disk, memory chip, ROM, RAM, an ASIC, a configured processor, optical storage, magnetic tape or other magnetic storage, or any other medium from which a computer processor can read instructions. The instructions may include processor-specific instructions determined by a compiler and/or an interpreter from code written in any suitable computer-programming language, including, for example, C, C++, C#, Visual Basic, Java, Python, Perl, JavaScript, and ActionScript.

The image editing service 704 also includes a number of external or internal devices such as input or output devices. For example, the image editing service 704 includes input/output (I/O) device(s) and/or ports 714, such as for enabling connection with a keyboard, a mouse, a pen, a voice input device, a touch input device, a display, speakers, a printer, or other I/O device. The image editing service 704 also includes additional storage 716, which may include removable storage and/or non-removable storage. The additional storage 716 may include, but is not limited to, magnetic storage, optical disks, and/or tape storage. The disk drives and their associated computer-readable media may provide non-volatile storage of computer-readable instructions, data structures, program modules, and other data. The image editing service 704 also includes a user interface 718. The user interface 718 is utilized by an operator, or other authorized user to access portions of the image editing service 704. In some examples, the user interface 718 includes a graphical user interface, web-based applications, programmatic interfaces such as application programming interfaces (APIs), or other user interface configurations. The image editing service 704 also includes data store 720. The data store 720 comprises data structures for storing information related to the implementation of the techniques described herein. Such information is stored in image database 722. Within the image database 722 is stored input images, depth maps, and other similar images, and maps, together with their associated information.

The depth generation engines 726(A), 726(B) are configured to generate depth maps based on a plurality of the images 118 captured by the image capture device 106 or captured by another image capture device and provided to one of the user devices 702(1)-702(N) or the image editing service 704. In some examples, the depth generation engines 726(A), 726(B) perform one or more operations to generate depth maps in accordance with techniques described in U.S. application Ser. No. 14/552,332 filed on Nov. 24, 2014, the entirety of which is hereby incorporated by reference. For example, as discussed in more detail in U.S. application Ser. No. 14/552,332, the depth generation engines 726(A), 726(B) may generate depth maps, all-in-focus images, and measures of uncertainty.

The depth refinement engines 728(A), 728(B) are configured to refine previously generated depth maps. In some examples, the depth refinement engines 728(A), 728(B) perform one or more refinement operations with respect to a depth map generated by one of the depth generation engines 726(A), 726(B). Such refinement operations function to improve the depth map. In some examples, improving the depth map includes increasing a likelihood that depths within the depth map are indeed the correct the depths. In some examples, improving the depth map may include identifying, by one of the depth refinement engines 728(A), 728(B), a quantity of additional images to capture and configuration settings to use when capturing the quantity of additional images. In some examples, the depth refinement engines 728 (A), 728(B) perform one or more operations to refine depth maps in accordance with techniques described in U.S. application Ser. No. 14/576,936 filed on Dec. 19, 2014, the entirety of which is hereby incorporated by reference. For example, as discussed in more detail in U.S. application Ser. No. 14/576, 936, the depth refinement engines 728(A), 728(B) estimate how many more images to take and what aperture settings and focus settings should be used in order to have sufficient depth information to refine a particular depth map. For example, the depth refinement engines 728(A), 728(B) may take as input an initial depth map, an all-in-focus image, and a measure of uncertainty. Based on these, it is recommended how many additional images should be captured and what aperture settings and focus setting should be used such that the initial depth map may be improved by some improvement criterion.

The image editing engines 730(A), 730(B) are configured to perform one or more operations relating to image editing. For example, after the images 118 have been captured in accordance with the image capture instructions 108 and a depth map has been generated (and optionally refined), one of the image editing engines 730(A), 730(B) are utilized to edit an image corresponding to the depth map. As noted previously, the depth map may be stored as a separate file associated with the image or may be included as data or metadata within the image file.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A computer-implemented method for generating image capture instructions by predictively determining in a scene-independent manner configuration settings to be used by a camera to capture a minimal quantity of images for generating a quality depth map, the method comprising:
  receiving, by a computer system, an input comprising an estimate of a distance of a portion of a scene from a viewpoint, wherein images of the scene are to be captured by the camera when the camera is located at the viewpoint;
  determining, by the computer system, a range of optimal blur radii for the images to be captured, the range of optimal blur radii indicating a sufficiency of depth information for generating the quality depth map;
  identifying, by the computer system, an aperture setting for the camera to be used when capturing the images of the scene;
  determining, by the computer system, a maximum length of an interval within a depth range corresponding to the estimate, wherein the maximum length of the interval is based at least in part on the range of optimal blur radii and a lens constant;
  determining, by the computer system and based on the maximum length of the interval, a quantity of intervals to be distributed within the depth range, the quantity of intervals corresponding to the minimal quantity of images;
  determining, by the computer system, a focus setting for each interval; and
  generating, by the computer system, the image capture instructions, each image capture instruction comprising the aperture setting and one of the focus settings.

2. The computer-implemented method of claim 1, wherein the quality depth map is a depth map in which portions of depth likelihoods of the scene are substantially unimodal.

3. The computer-implemented method of claim 1, wherein the range of optimal blur radii is about 1 to about 2 pixels in at least two images of the minimal quantity of images.

4. The computer-implemented method of claim 1, wherein the estimate of the distance of the portion of the scene from the viewpoint comprises an estimate of a distance of a closest element of the scene from the viewpoint.

5. The computer-implemented method of claim 1, further comprising determining, by the computer system and based on the quantity of intervals, an optimal length of each interval of the quantity of intervals.

6. The computer-implemented method of claim 1, wherein the aperture setting comprises a smallest available aperture setting for the camera that will produce blur within the range of optimal blur radii in each interval in the depth range.

7. The computer-implemented method of claim 1, further comprising:
    capturing a plurality of images in accordance with the image capture instructions, each of the individual images of the plurality of images being captured according to one of the image capture instructions; and
    estimating the depth of pixels corresponding to elements of the scene from the viewpoint by generating a depth map, the depth map generated using the plurality of images.

8. The computer-implemented method of claim 1, wherein the input is received via selection of a shooting mode of the camera, and the estimate of the distance is dependent on the shooting mode.

9. The computer-implemented method of claim 1, wherein the computer-implemented method is implemented on a user device in which the camera is embodied.

10. A system for generating image capture instructions by predictively determining in a scene-independent manner configuration settings to be used by a camera to capture a minimal quantity of images for generating a quality depth map, the system comprising:
    memory that stores computer-executable instructions; and
    at least one processor configured to access the memory and execute the computer-executable instructions to cause the system to perform operations comprising:
        receiving an input comprising an estimate of a distance of a portion of a scene from a viewpoint, wherein images of the scene are to be captured by the camera when the camera is located at the viewpoint;
        determining a range of optimal blur radii for the images to be captured, the range of optimal blur radii indicating a sufficiency of depth information for generating the quality depth map;
        identifying an aperture setting for the camera to be used when capturing the images of the scene;
        determining a maximum length of an interval within a depth range corresponding to the estimate, wherein the maximum length of the interval is based at least in part on the range of optimal blur radii and a lens constant;
        determining, based on the maximum length of the interval, a quantity of intervals to be distributed within the depth range, the quantity of intervals corresponding to the minimal quantity of images;
        determining a focus setting for each interval; and
        generating the image capture instructions, each image capture instruction comprising the aperture setting and one of the focus settings.

11. The system claim 10, wherein the quality depth map is a depth map in which portions of depth likelihoods of the scene are substantially unimodal.

12. The system of claim 10, wherein the input further comprises a target quantity of images to be captured by the camera, the method further comprising:
    adjusting at least one of the aperture setting and the focus settings for each image when the target quantity is different than the minimal quantity of images, wherein adjusting at least one of the aperture setting and the focus setting results in more blur or less blur in each interval in the depth range; and
    updating the image capture instructions based on the adjusting.

13. The system of claim 10, wherein the estimate of the distance of the portion of the scene from the viewpoint comprises an estimate of a distance of a closest element of the scene from the viewpoint.

14. The system of claim 10, wherein the range of optimal blur radii is determined based at least in part on a scene independent portion of a depth discriminability function.

15. The system of claim 10, wherein the aperture setting comprises a smallest available aperture setting for the camera that will produce blur within the range of optimal blur radii in each interval in the depth range.

16. The system of claim 10, wherein the memory, the at least one processor, and the camera are embodied in a user device, and wherein executing the computer-executable instructions further causes the system to perform operations comprising:
    capturing a plurality of images in accordance with the image capture instructions, each of the individual images of the plurality of images being captured according to one of the image capture instructions;
    estimating the depth of pixels corresponding to elements of the scene from the viewpoint by generating a depth map, the depth map generated using the plurality of images; and
    providing at least a portion of the depth map for presentation on a user interface of the user device.

17. The system of claim 10, wherein the input is received via selection of a shooting mode of the camera, and the estimate of the distance is dependent on the shooting mode.

18. One or more computer-readable storage devices for storing computer-executable instructions that, when executed by one or more computer systems, configure the one or more computer systems to generate image capture instructions by predictively determining in a scene-independent manner configuration settings to be used by a camera to capture a minimal quantity of images for generating a quality depth map by performing operations comprising:
    receiving depth range information, the depth range information comprising an estimate of a distance of a portion of a scene to be imaged from a viewpoint;
    identifying a range of optimal blur radii for images to be captured of the scene, wherein the range of optimal blur radii indicates a sufficiency of depth information for generating the quality depth map;
    identifying an aperture setting for the camera to be used when capturing the images of the scene;
    selecting a depth value that is equal to a minimum depth value of a depth range, the depth range corresponding to the estimate;
    determining a focus setting, greater than the depth value, at which pixels in a captured image will experience blur within the range of optimal blur radii at the depth value;
    over the remainder of the depth range, (i) determining a next depth value greater than the prior focus setting at which pixels in the captured image will experience blur within the range of optimal blur radii, and (ii) determining a next focus setting, greater than the next depth value, at which pixels in the captured image will experience blur within the range of optimal blur radii at the next depth value; and generating the image capture instructions, each image capture instruction comprising the aperture setting and one of the focus settings.

19. The one or more computer-readable storage devices of claim 18, wherein the depth range information is received via selection of a shooting mode of the camera, and the estimate of the distance is dependent on the shooting mode.

20. The one or more computer-readable storage devices of claim 18, wherein the range of optimal blur radii is about 1 to about 2 pixels in at least two images of the minimal quantity of images.

* * * * *